United States Patent
Kannan et al.

(10) Patent No.: US 12,470,659 B2
(45) Date of Patent: Nov. 11, 2025

(54) SYSTEM AND METHOD FOR PLAYING A PERSONALIZED VOICE RECORDING WITH A STATUS UPDATE TO FOLLOW-UP CUSTOMER ON AN INBOUND CALL IN A CONTACT CENTER

(71) Applicant: NICE LTD., Ra'anana (IL)

(72) Inventors: Sudarshan Kannan, Pune (IN); Sean Purdy, Knoxville, TN (US)

(73) Assignee: NICE LTD., Ra'anana (IL)

( * ) Notice: Subject to any disclaimer, the term of this patent is extended or adjusted under 35 U.S.C. 154(b) by 225 days.

(21) Appl. No.: 18/223,037

(22) Filed: Jul. 18, 2023

(65) Prior Publication Data

US 2025/0030800 A1   Jan. 23, 2025

(51) Int. Cl.
*H04M 3/51* (2006.01)
*G10L 13/04* (2013.01)
*G10L 15/18* (2013.01)

(52) U.S. Cl.
CPC .......... *H04M 3/5191* (2013.01); *G10L 13/04* (2013.01); *G10L 15/1815* (2013.01); *G10L 15/1822* (2013.01); *H04M 3/5166* (2013.01); *H04M 2201/39* (2013.01); *H04M 2203/301* (2013.01)

(58) Field of Classification Search
CPC ............. H04M 3/5191; H04M 3/5166; H04M 2201/39; H04M 2203/301; H04M 3/42221; H04M 3/5175; G10L 13/04; G10L 15/1815; G10L 15/1822; G10L 25/63
See application file for complete search history.

(56) References Cited

U.S. PATENT DOCUMENTS

| | | | | |
|---|---|---|---|---|
| 8,107,613 | B2* | 1/2012 | Gumbula | H04M 3/42221 379/265.11 |
| 8,630,886 | B2* | 1/2014 | White | G06Q 10/20 705/7.27 |
| 9,785,690 | B2* | 10/2017 | Bandera | G06F 3/04842 |
| 10,726,363 | B2* | 7/2020 | Gomes | G06F 11/362 |
| 11,184,317 | B1* | 11/2021 | Doorn | H04L 51/234 |
| 11,347,375 | B2* | 5/2022 | Bar-On | G06Q 10/06 |
| 2004/0161097 | A1* | 8/2004 | Henry | H04M 15/51 379/266.02 |
| 2008/0056233 | A1* | 3/2008 | Ijidakinro | H04L 65/103 370/352 |

(Continued)

*Primary Examiner* — Akelaw Teshale
(74) *Attorney, Agent, or Firm* — SOROKER AGMON NORDMAN RIBA

(57) ABSTRACT

A computer-implemented method for playing a personalized voice recording with a status update to follow-up customer on an inbound call in a contact center. The computer-implemented method includes marking one or more open tickets as predicted for follow-up inbound call and predicted date and time for the follow-up call in an inbound database; updating status of one or more open ticket marked as predicted for follow-up inbound call and predicted date and time; converting the updated status to a voice recording; and operating an inbound software to identify an inbound call as a follow-up inbound call of a customer received via a Voice over Internet Protocol (VoIP) network communicating with a customer's mobile device. The customer has an open ticket with an updated status and playing voice recording with the status update in the identified inbound call, thus reducing customers waiting time and agents' workload.

15 Claims, 18 Drawing Sheets

(56) References Cited

U.S. PATENT DOCUMENTS

| | | | | |
|---|---|---|---|---|
| 2011/0066559 A1* | 3/2011 | White | ................... | G06Q 10/00 |
| | | | | 706/46 |
| 2016/0057284 A1* | 2/2016 | Nagpal | ............... | H04M 3/5232 |
| | | | | 379/266.07 |
| 2021/0201327 A1* | 7/2021 | Konig | ................... | G06Q 30/02 |

* cited by examiner

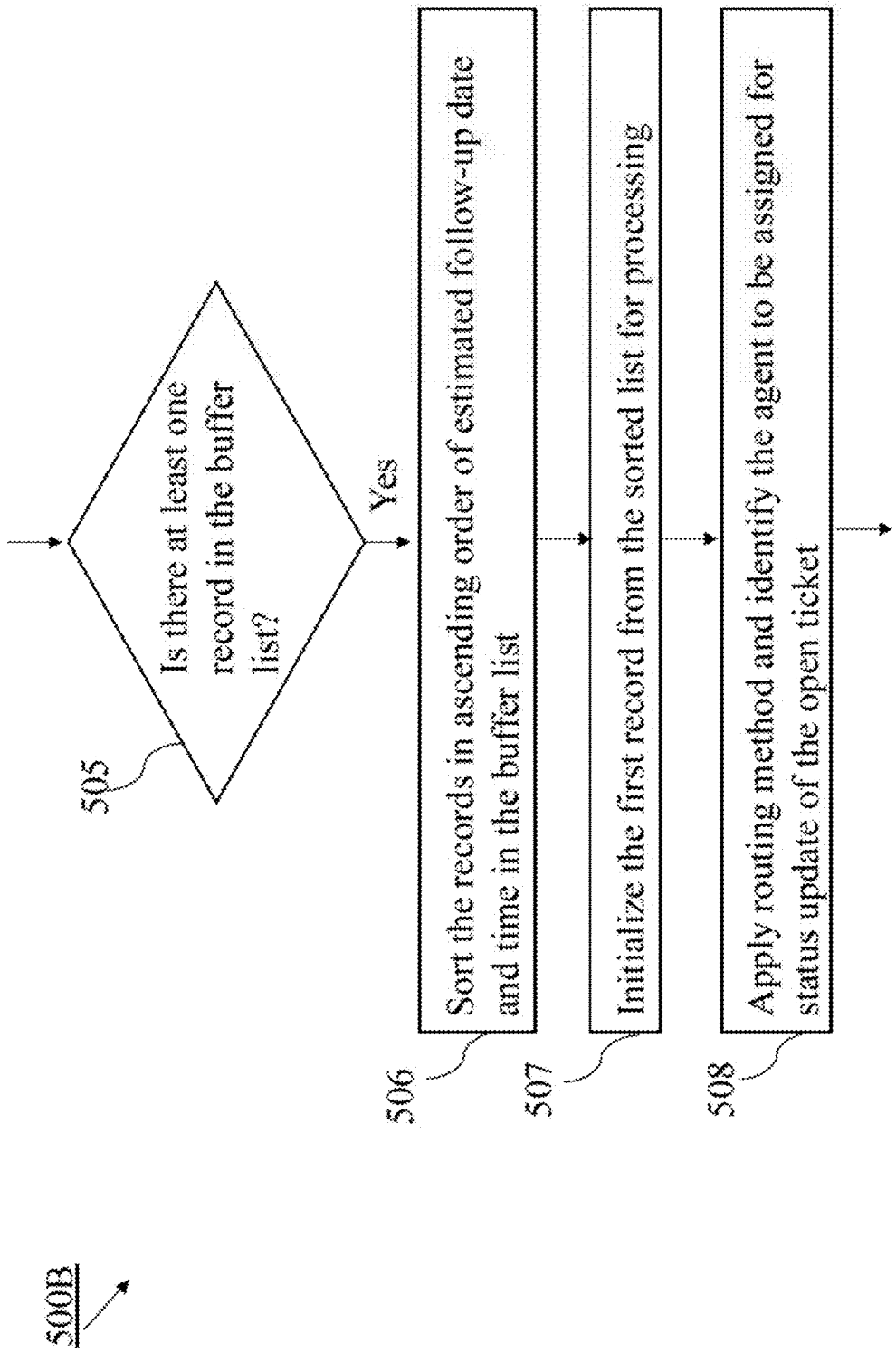

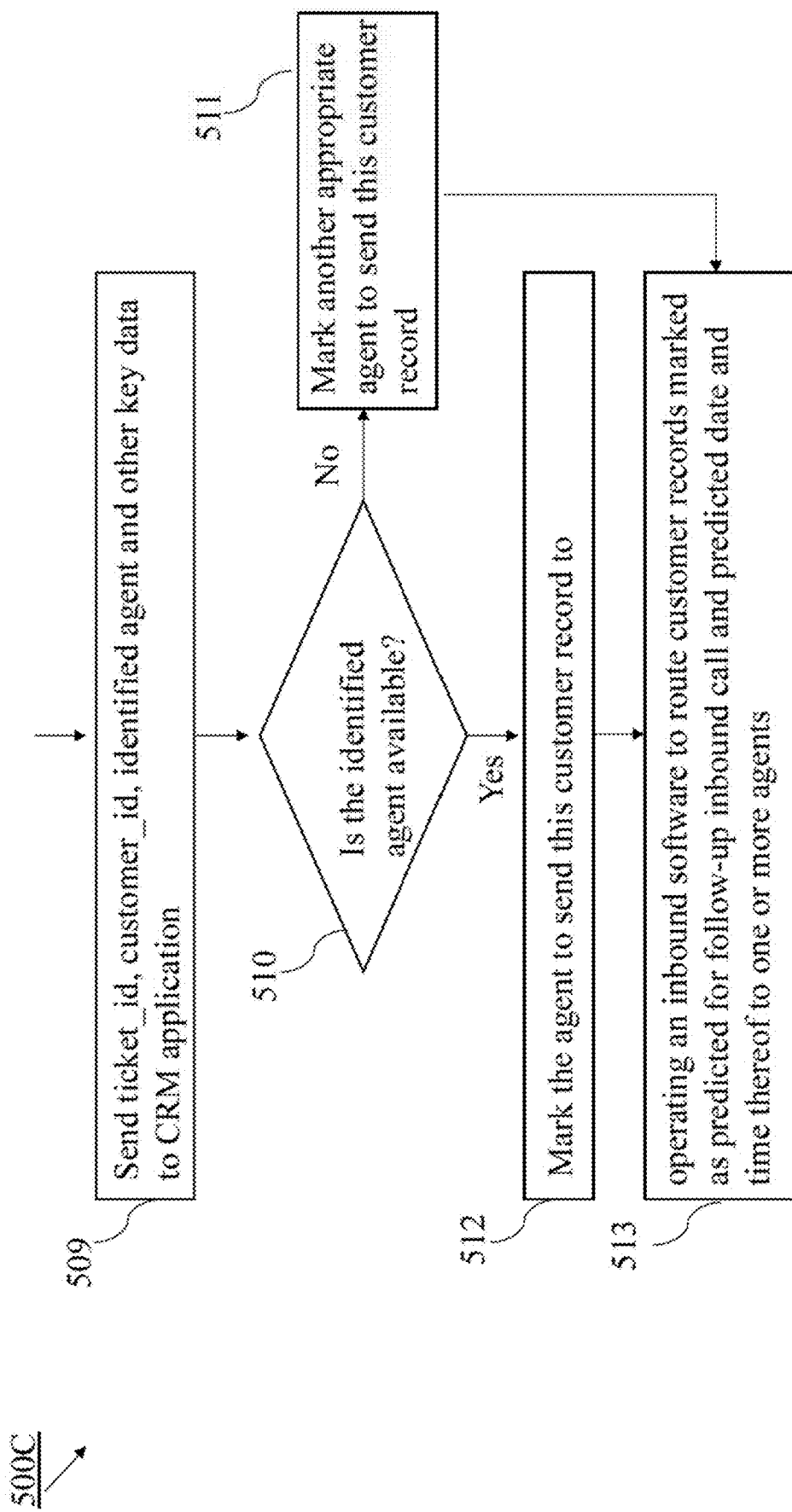

SYSTEM AND METHOD FOR PLAYING A PERSONALIZED VOICE RECORDING WITH A STATUS UPDATE TO FOLLOW-UP CUSTOMER ON AN INBOUND CALL IN A CONTACT CENTER

TECHNICAL FIELD

The present disclosure relates to the field of improving customer service in a contact center by playing personalized recordings with status updates to follow-up customers in inbound calls.

BACKGROUND

In contact centers, during peak times, it is seen that the number of inbound calls received in the contact center are much higher than the capacity of the agents. On the other hand, low inbound call volumes can be experienced for some scattered hours within a day or across days depending on the business. During these non-peak times agents may be assigned other tasks.

The volume of inbound call may not be predictable as it may vary at different times of the day and on different days of the week, such as working days, weekends, holidays, festival occasions, or discount occasions. Commonly, contact center managers and supervisors reserve some extra buffer of agents to handle unexpected increase in call volumes during peak-times. However, they cannot over-do the extra-agent staffing as it may hit the operational costs.

There is a constant need to improve contact centers efficiency and customer satisfaction. Currently, in contact centers, there is no way of knowing whether current incoming call that has arrived in queue is a 'First call request' by a customer or a 'Follow-up call'. Currently, all calls are answered by the contact center as and when they come in and routed to agents. Consequently, agents are often overloaded during peak-times while answering follow-up calls and customers of first-call request have to wait in queue. Many of these customers of first-call request hang-up while waiting in queue, which leads to increased customer frustration or dis-satisfaction and a drop in the Net Promotor Score (NPS) of the company.

Patent publication application No. US 2020/0259952 A1 describes a personalized wait treatment facilitated for the customer by opening a second media stream, however, it doesn't teach or suggest identifying follow-up customers or playing voice status update to a customer on the customer open ticket with the contact center.

Accordingly, there is a need for a technical solution for playing a personalized voice recording with a status update to follow-up customer on an inbound call in a contact center.

SUMMARY

There is thus provided, in accordance with some embodiments of the present disclosure, a computer-implemented method for playing a personalized voice recording with a status update to follow-up customer on an inbound call in a contact center.

Furthermore, in accordance with some embodiments of the present disclosure, the computer-implemented method includes marking one or more open tickets as predicted for follow-up inbound call and predicted date and time for the follow-up call in an inbound database; updating status of one or more open ticket marked as predicted for follow-up inbound call and predicted date and time: converting the updated status to a voice recording; and operating an inbound software to identify an inbound call as a follow-up inbound call of a customer received via a Voice over Internet Protocol (VoIP) network communicating with a customer's mobile device, where the customer has an open ticket with an updated status and playing voice recording with the status update in the identified inbound call, thus reducing customers waiting time and agents' workload.

Furthermore, in accordance with some embodiments of the present disclosure, the marking as predicted for follow-up of the one or more open tickets may be operated by: operating the inbound software to retrieve one or more open tickets of customers from an inbound database; for each open ticket in the one or more open tickets: retrieving recording related to last interaction of the open ticket; operating a predictive model on the retrieved recording to predict a follow-up inbound call and predicted date and time thereof for the open ticket; and sending the predicted follow-up inbound call and predicted date and time thereof to the inbound software to store the follow-up inbound call and predicted date and time thereof in the inbound database.

Furthermore, in accordance with some embodiments of the present disclosure, the predictive model may predict the follow-up inbound call and predicted date and time thereof by operating a speech analyzer module to perform sentiment analysis via semantic parsing as well as direct voice sentiment analysis of the retrieved recording; and operating a follow-up predictor module to predict a follow-up call to the contact center and related date and time.

Furthermore, in accordance with some embodiments of the present disclosure, the updating of the status of the one or more open tickets may be operated by: operating an inbound software to route customer records marked as predicted for follow-up inbound call and predicted date and time thereof to one or more agents; and receiving a status of the open ticket from an agent of the one or more agents via a computerized device of the agent and storing the status as a status update in the routed customer record of the customer records in the inbound database via a Customer Relationship Management (CRM) application that is communicating with the computerized device of the agent. The received status may be in text format.

Furthermore, in accordance with some embodiments of the present disclosure, the status of the open ticket received from the agent has been provided by one or more users or retrieved from one or more applications.

Furthermore, in accordance with some embodiments of the present disclosure, the customer records may be routed based on the predicted date and time of follow-up inbound call.

Furthermore, in accordance with some embodiments of the present disclosure, the customer records may be routed to one or more agents during non-peak times in the contact center based on availability of the one or more agents.

Furthermore, in accordance with some embodiments of the present disclosure, the customer records may be routed to an agent that is a dedicated agent who has handled the customer open ticket so far or to an agent of one or more agents related to the open ticket, and the agent may be the last agent that handled the customer, or the agent has highest satisfaction score from all agents related to the open ticket, or the agent has highest satisfaction score from all agents that handled previous closed tickets of the customer.

Furthermore, in accordance with some embodiments of the present disclosure, the converting of the updated status to the voice recording may be operated by a Text To Speech (TTS) Application Programming Interface (API) engine having custom voice Artificial intelligence (AI) capabilities, and the voice in the voice recording may be of the agent.

There is further provided, in accordance with some embodiments of the present disclosure, a computerized system for playing a personalized voice recording with a status update to follow-up customer on an inbound call in a contact center.

Furthermore, in accordance with some embodiments of the present disclosure, the computerized system may include one or more processors; an inbound software; and an inbound database. The one or more processors may be configured to mark one or more open tickets as predicted for follow-up inbound call and predicted date and time for the follow-up call in the inbound database; update status of one or more open ticket marked as predicted for follow-up inbound call and predicted date and time; convert the updated status to a voice recording; and operate the inbound software to identify an inbound call as a follow-up inbound call of a customer received via a Voice over Internet Protocol (VOIP) network communicating with a customer's mobile device wherein the customer has an open ticket with an updated status and play voice recording with the status update in the identified inbound call, thus reducing customers waiting time and agents' workload.

Furthermore, in accordance with some embodiments of the present disclosure, the one or more processors may be configured to mark the one or more open tickets as predicted for follow-up by: operating the inbound software to retrieve one or more open tickets of customers from an inbound database; for each open ticket in the one or more open tickets: retrieving recording related to last interaction of the open ticket; operating a predictive model on the retrieved recording to predict a follow-up inbound call and predicted date and time thereof for the open ticket; and sending the predicted follow-up inbound call and predicted date and time thereof to the inbound software to store the follow-up inbound call and predicted date and time thereof in the inbound database.

Furthermore, in accordance with some embodiments of the present disclosure, the predictive model may predict the follow-up inbound call and predicted date and time thereof by operating a speech analyzer module to perform sentiment analysis via semantic parsing as well as direct voice sentiment analysis of the retrieved recording; and operating a follow-up predictor module to predict a follow-up call to the contact center and related date and time.

Furthermore, in accordance with some embodiments of the present disclosure, the one or more processors may be configured to update the status of the one or more open tickets by: operating an inbound software to route customer records marked as predicted for follow-up inbound call and predicted date and time thereof to one or more agents; receiving a status of the open ticket from an agent of the one or more agents via a computerized device of the agent and storing the status as a status update in the routed customer record of the customer records in the inbound database via a Customer Relationship Management (CRM) application that is communicating with the computerized device of the agent. The received status may be in text format.

Furthermore, in accordance with some embodiments of the present disclosure, the status of the open ticket received from the agent has been provided by one or more users or retrieved from one or more applications.

Furthermore, in accordance with some embodiments of the present disclosure, the customer records may be routed based on the predicted date and time of follow-up inbound call.

Furthermore, in accordance with some embodiments of the present disclosure, the customer records may be routed to one or more agents during non-peak times in the contact center based on availability of the one or more agents.

Furthermore, in accordance with some embodiments of the present disclosure, the customer records may be routed to an agent that is a dedicated agent who has handled the customer open ticket so far or to an agent of one or more agents related to the open ticket, and wherein the agent is the last agent that handled the customer, or the agent has highest satisfaction score from all agents related to the open ticket, or the agent has highest satisfaction score from all agents that handled previous closed tickets of the customer.

Furthermore, in accordance with some embodiments of the present disclosure, the one or more processors may be configured to convert the updated status to the voice recording by a Text To Speech (TTS) Application Programming Interface (API) engine having custom voice Artificial Intelligence (AI) capabilities and wherein the voice in the voice recording is of the agent.

BRIEF DESCRIPTION OF THE DRAWINGS

FIG. 5A-5E is a high-level flowchart of playing a personalized voice recording with a status update to follow-up customer on an inbound call in a contact center, in accordance with some embodiments of the present disclosure;

DETAILED DESCRIPTION

Figure 1A:
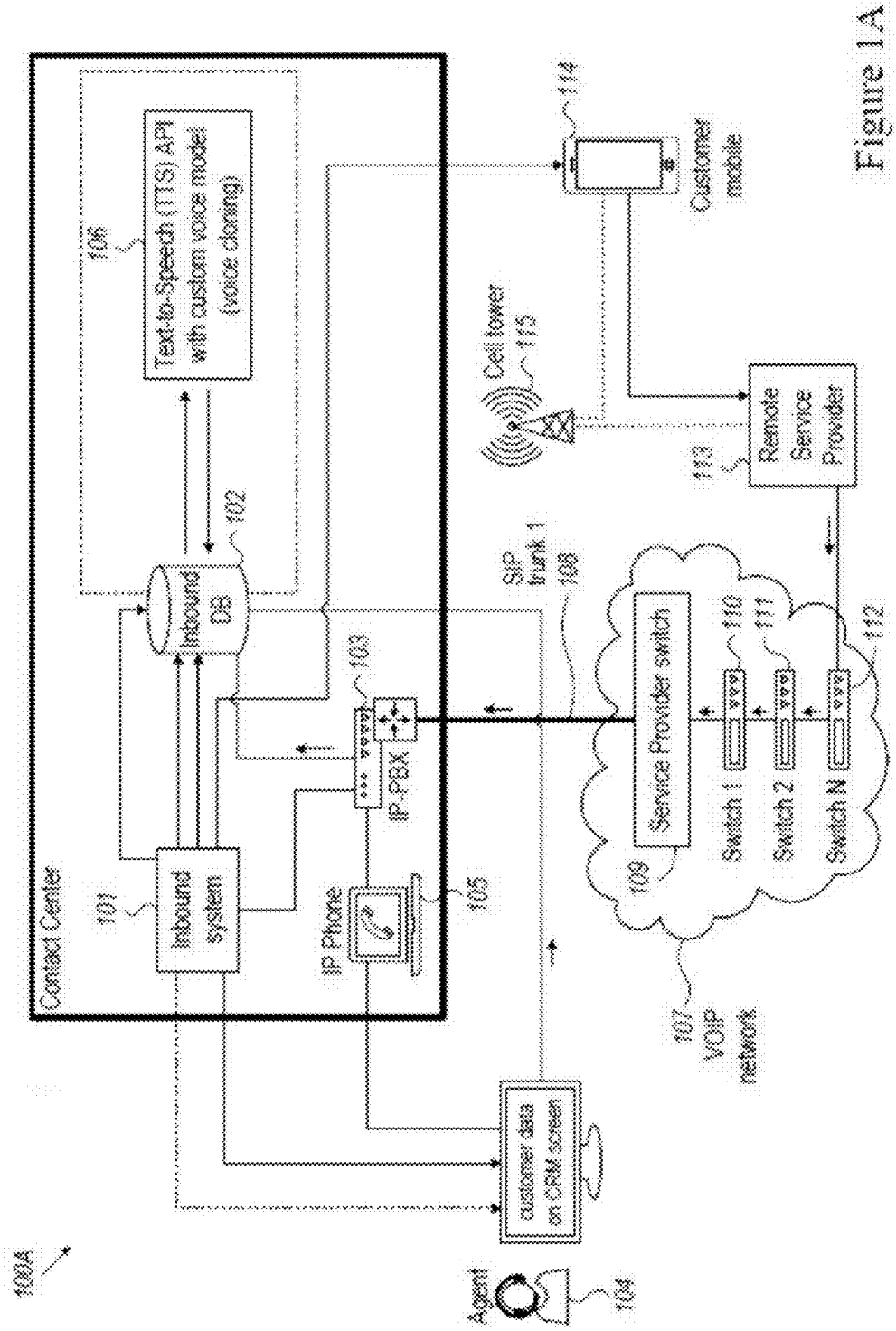
FIGS. 1A-1B schematically illustrate a high-level diagram of a system for playing a personalized voice recording with a status update to follow-up customer on an inbound call in a contact center, in accordance with some embodiments of the present disclosure.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

In contact centers during non-peak times, the agents are under-utilized which consequently affects the operational cost of maintaining a set number of agents at the contact center and also the agents are less productive. During peak-times all agents in the contact center are busy serving customers and commonly the volume of inbound calls is higher than the capacity of the agents. Therefore, customers are waiting in queue for an interaction with an agent. A significant percentage of the customers hang-up during peak-time while waiting in queue which leads to customer frustration and dissatisfaction.

Accordingly, there is a need for a technical solution to better utilize agents during non-peak times and to provide customer service more efficiently during peak-times, thus increasing customer satisfaction score.

Thus, there is provided, in accordance with some embodiments of the present disclosure, system and method that categorizes incoming calls as 'first calls' and 'follow-up calls' and eliminates 'follow-up' calls from the waiting queue by playing a personalized voice recording with a status update for a currently open ticket.

FIG. 1A schematically illustrates a high-level diagram of a system 100A for playing a personalized voice recording with a status update to follow-up customer on an inbound call in a contact center, in accordance with some embodiments of the present disclosure.

According to some embodiments of the present disclosure, in a system, such as system 100A for playing a personalized voice recording with a status update to follow-up customer on an inbound call in a contact center, one or more open tickets may be marked as predicted for follow-up inbound call and predicted date and time for the follow-up call in an inbound database, such as inbound database 102.

According to some embodiments of the present disclosure, an inbound system, such as inbound system 101 may fetch customer data with ticket details for which follow-up flag is set, i.e., marked as predicted for follow-up inbound call from the inbound database 102.

According to some embodiments of the present disclosure, during non-peak time the customer and ticket details may be forwarded to an agent via Customer Relationship Management (CRM) User Interface (UI) screen for status update. The status update of the agent may be in text format.

According to some embodiments of the present disclosure, the status of one or more open ticket marked as predicted for follow-up inbound call and predicted date and time may be updated by an agent during non-peak time in the contact center. The one or more open tickets may be marked as predicted for follow-up inbound call and predicted date and time by a model, such as predictive model 305 in FIG. 3.

According to some embodiments of the present disclosure, the status update may be operated by the agent via a User Interface (UI) of an application, such as Customer Relationship Management (CRM) application. The UI of the CRM application may be designed to include a 'Status Update' text-box, along with current UI screens which are showing customer details. In this text-box, for each open ticket record of a customer, where a follow-up is anticipated, that may be routed to the agent by an inbound system 101, such as Inbound Automatic Call Distributor (ACD), the status of the open ticket may be entered in text format.

According to some embodiments of the present disclosure, an inbound software, such as inbound system 101 may be operated to route customer records marked as predicted for follow-up inbound call and predicted date and time thereof to one or more agents. The status of the open ticket may be received from an agent of the one or more agents via a computerized device of the agent and the status may be stored as a status update in the routed customer record of the customer records in the inbound database 102 via the CRM application that is communicating with the computerized device of the agent and the inbound system 101.

According to some embodiments of the present disclosure, the agent may be the agent who has served the customer on the open ticket so far, or the last agent that handled the customer, or the agent that has highest satisfaction score from all agents related to the open ticket, or the agent that has highest satisfaction score from all agents that handled previous closed tickets of the customer.

According to some embodiments of the present disclosure, customer records may be marked as predicted for follow-up of the one or more open tickets by operating the inbound software, such as inbound system 101 to retrieve one or more open tickets of customers from an inbound database. For each open ticket in the one or more open tickets recording related to last interaction of the open ticket may be retrieved. A predictive model may be operated on the retrieved recording to predict a follow-up inbound call and predicted date and time thereof for the open ticket. The predicted follow-up inbound call and predicted date and time thereof may be sent to the inbound software, such as inbound system 101 to store the follow-up inbound call and predicted date and time thereof in the inbound database 102.

According to some embodiments of the present disclosure, the information as to the status of the open ticket received from the agent may be provided by one or more users or retrieved from one or more applications. The agent may check the contact center database, internal or integrated applications, collaborate with partners through internal apps, or consult with supervisors and/or other internal stakeholders involved in solving the customer issue as necessary, and then may enter a cumulative text update in the 'Status Update' field of the CRM UI screen with the information related to the open ticket.

According to some embodiments of the present disclosure, the CRM UI screen may further have an 'agent_id' dropdown adjacent to the 'Status Update' field, such that the voice recording may be preselected to be the selected agent_id form the dropdown. The selected agent may be the existing agent to whom the customer record was routed and who has entered the status update i.e., the agent can either be the original agent who has served the customer till now or the last agent or the agent with highest satisfaction score for this customer.

According to some embodiments of the present disclosure, the updated status of the open ticket in text format may be converted into voice recording in audio format. The conversion of the updated status from text format to the voice recording may be operated by a Text To Speech (TTS) Application Programming Interface (API) engine having custom voice Artificial intelligence (AI) capabilities 106, and the voice in the voice recording may be the voice of the agent chosen in the agent_id field, i.e., agent chosen in the agent_id dropdown adjacent to the status update field in the CRM UI screen.

According to some embodiments of the present disclosure, the TTS API engine may read the status update in text format for a customer's open ticket record disposed by the agent and may convert the text into 'custom' speech in the particular agent's voice, i.e., the voice of the agent that may have been selected in the 'agent_id' for voice conversion field via the CRM UI screen.

According to some embodiments of the present disclosure, the TTS API engine may provide a custom voice i.e., AI-powered voice cloning capabilities. A custom voice is a Text-to-Speech feature that allows to train a custom voice model using different targeted studio-quality audio recordings. The targeted voice may be the voice of different agents in the contact center.

According to some embodiments of the present disclosure, the speech in the voice recording may be synthesized in a particular agent's voice, by a custom voice model. The custom voice model may be trained with audio recording samples of all agents in the contact center. The TTS API engine with the custom voice model would then be capable of playing the status update to customers in the specific agent's voice.

According to some embodiments of the present disclosure, all contact centers have compliance regulations and quality checks to be followed. Therefore, they have internal or third-party recorders which integrate with their software and record significant or even all of the agent-customer interactions. There are policies defined to maintain each recording for a particular time period before purging it. At any given time, contact centers may have a large number of agent-customer interaction recordings. The contact center can leverage these recordings to supply multiple audio samples of agents to train the custom voice model, which we are using in this invention.

According to some embodiments of the present disclosure, the converted voice recording may be stored in an audio file format, such as Waveform Audio File (wav) file in the inbound database 102 against the customer's open ticket marked for follow-up call.

According to some embodiments of the present disclosure, the status update recording may be played as 'personalized voice' to the customer when the customer may make a follow-up call to the contact center. Most customers would call-in during peak times, i.e., when all agents are busy on other calls. At that time, even if a customer is not able to connect with a live agent, the customer may listen to the elaborated status update on the open ticket.

According to some embodiments of the present disclosure, the inbound software, such as inbound system 101 may be operated to identify an inbound call as a follow-up inbound call of a customer received via a Voice over Internet Protocol (VoIP) network 107 communicating with a customer mobile device 114. The customer may have an open ticket with an updated status recording and the voice recording may be played with the status update in the identified inbound call, thus reducing customers waiting time and agents' workload.

According to some embodiments of the present disclosure, the call of the customer via the customer mobile 114 may be received by a remote service provider 113 via a cellular tower 115 and then may be forwarded via one or more switches such as switches 110, 111 and 112 in the VOIP network to the service provider switch 109. The service provider switch 109 may forward the call via a Session Initiation Protocol (SIP) trunk 108 to a contact center IP-PBX 103 which may forward it to the inbound system 101.

According to some embodiments of the present disclosure, upon the inbound call from the customer, the inbound system 101 may fetch the personalized voice recording status update e.g., wav file, for the customer record from the inbound database 102 to be played, to the customer in case the customer has an open ticket that a status updated has been entered for.

According to some embodiments of the present disclosure, the status update of the open ticket may be played to the follow-up customer as soon as the customer calls-in the contact center, and the customer will not wait in queue. Thus, follow-up customers need not wait in queue when they call the contact center for a status update as to an open ticket which may be significant especially during peak-time.

According to some embodiments of the present disclosure, the follow-up call occurrence of the customer may be marked in the inbound database 102 and a notification may be sent for the agent 104 via the CRM UI screen. Optionally, the customer may choose to wait to talk to a live agent after the status update has been played, in such scenario the customer call may go through the normal wait-queue process to get connected to the agent. In that case the inbound system 101 may find the best agent and may extract the agent_id and extension. Suppose the best agent found by the inbound system 101 is Agent 104 using IP Phone 105 in FIG. 1A, then the call may be forwarded to an IP phone 105 of the agent.

According to some embodiments of the present disclosure, even though the notification may be sent for the agent 104 the customer may wait in queue for the dedicated agent 104 or wait in queue for any other agent that may be available.

According to some embodiments of the present disclosure, the status update that may be played for follow-up customers may be in a higher quality than an update from a random agent available during peak-time because the random agent may not know the complete context of the customer's open ticket and it might take longer time to get the information about the open ticket.

According to some embodiments of the present disclosure, pre-work on the open ticket was already done by the assigned agent earlier during non-peak times, and an elaborate text status update was entered to the CRM system and then converted to voice to be stored as an audio file. Therefore, the personalized voice status update played to the follow-up customer when the customer calls-in during peak-time would be more thorough.

According to some embodiments of the present disclosure, the customer records may be routed to one or more agents during non-peak times in the contact center based on availability of the one or more agents.

According to some embodiments of the present disclosure, the customer records are routed based on the predicted date and time of follow-up inbound call, in ascending order.

According to some embodiments of the present disclosure, a significant percentage of inbound calls which are follow-up calls may be handled by system 100A, thus saving wait time for these customers.

Figure 1B:
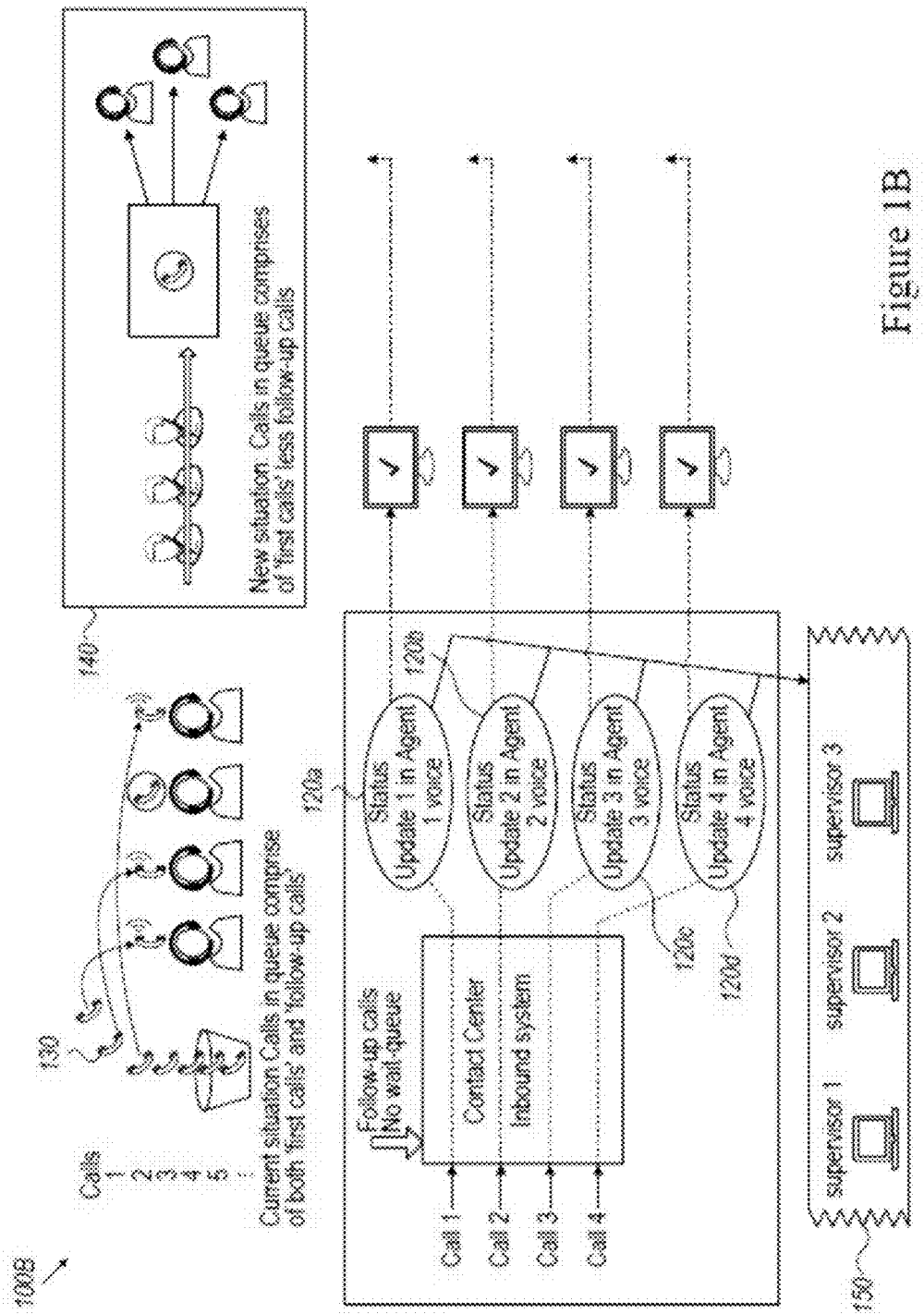

FIG. 1B schematically illustrate a high-level diagram of a system 100B for playing a personalized voice recording with a status update to follow-up customer on an inbound call in a contact center, in accordance with some embodiments of the present disclosure.

In current systems 'first' calls' and follow-up' calls are waiting in queue 130.

According to some embodiments of the present disclosure, in a system such as system 100A in FIG. 1A and such as system 100B there may be less follow-up calls in the queue 140 because some customers may hang-up after the status update 120a-120d has been played.

According to some embodiments of the present disclosure, a personalized status update such as status update 120a-120d may be played to the customer as soon as the customer makes a follow-up call on the open ticket. There may be no wait-queue for follow-up calls. If the customer may still want to connect to an agent, the inbound system may place the customer in the wait-queue after playing the status update. Once the status update is played to a customer, the particular agent that may have entered the text status update and a preconfigured number of users, such as a pool of supervisors 150, may be notified that the customer had made a follow-up call. Based on the customer sentiment a supervisor may selectively make an outbound call to customers with further updates as to status of the open ticket.

According to some embodiments of the present disclosure, based on the notification, the particular agent or one of the users, such as supervisors, may prioritize, further work and enter latest updates on the customer open-ticket. When the customer has already made a follow-up call and listened to the status update the particular agent, or one of the supervisors, may also later make an outbound call to this follow-up customer on the open-ticket so as to provide any new update and/or to maintain the rapport with the customer.

According to some embodiments of the present disclosure, in a system, such as system 100A in FIG. 1A, the follow-up calls may not be part of the inbound wait-queue when they hit the contact center. Thus, off-loading these follow-up calls from the wait-queues, which may have significant impact during peak-times, since it is estimated that approximately 40% of inbound calls are follow-up calls. Moreover, the load on live agents, e.g., inbound traffic during peak times may decrease proportionally to the percentage of follow-up call customers who are satisfied and hang-up the call after listening to their personalized voice status update.

According to some embodiments of the present disclosure, a significant percentage of customers on follow-up calls are expected to be satisfied with the status update played to them. They may not have to further wait in wait-queue for a live agent and would directly hang-up the call after listening their personalized status update.

According to some embodiments of the present disclosure, the percentage of follow-up customers closing the call after listening to their personalized status update without needing a live agent may be a measure for the contact center for follow-up call handling and may be a follow-up call success measure. For customers who still want to connect to a live agent after listening to their status update, the interaction duration with live agents may be significantly reduced, because the personalized status update played to them might have answered most part of their query, thus, it may increase the efficiency of interactions.

According to some embodiments of the present disclosure, if needed, the agents may make an outbound call when they are free and provide further updates as to the status of the open ticket.

Figure 2A:
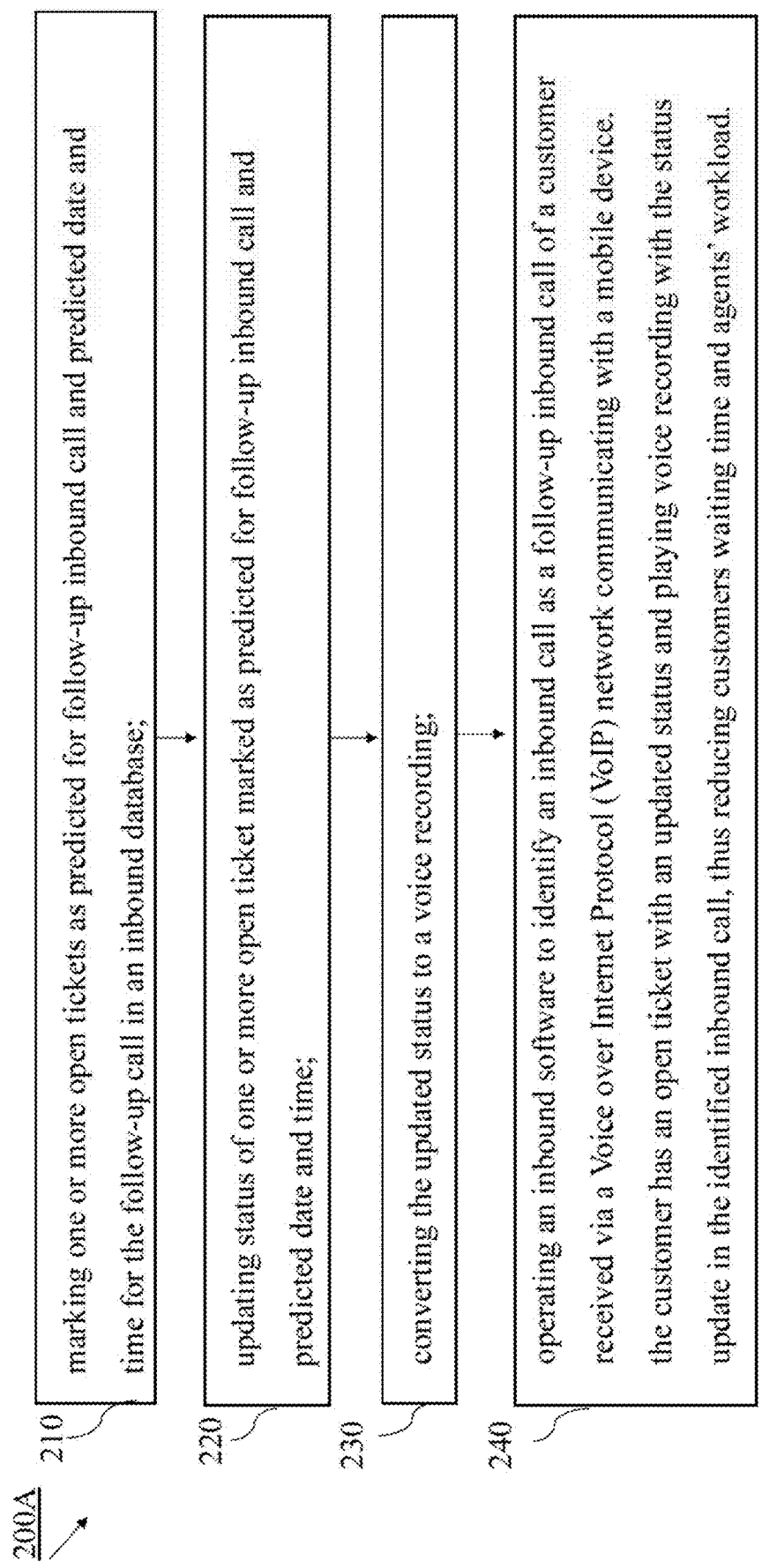
FIGS. 2A-2B are a high-level workflow of playing a personalized voice recording with a status update to follow-up customer on an inbound call in a contact center, in accordance with some embodiments of the present disclosure.
Figure 2B:
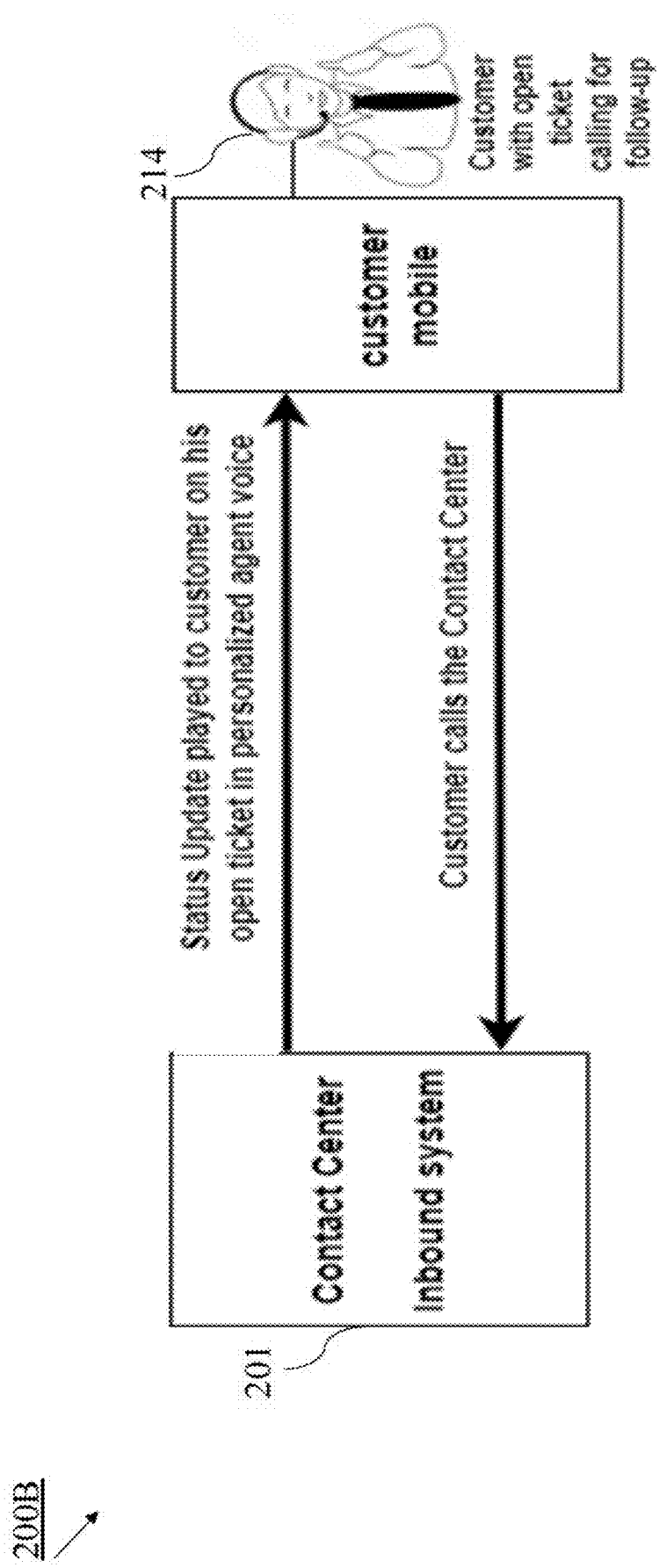

FIG. 2A is a high-level workflow 200A of playing a personalized voice recording with a status update to follow-up customer on an inbound call in a contact center, in accordance with some embodiments of the present disclosure.

According to some embodiments of the present disclosure, workflow 200A of playing a personalized voice recording with a status update to follow-up customer on an inbound call in a contact center, may be operated in a system, such as system 100A in FIG. 1A and system 200B in FIG. 1B. The customer call may be received in a contact center inbound system 201 from a customer with open ticket 214.

According to some embodiments of the present disclosure, operation 210 comprising marking one or more open tickets as predicted for follow-up inbound call and predicted date and time for the follow-up call in an inbound database.

According to some embodiments of the present disclosure, operation 220 comprising updating status of one or more open ticket marked as predicted for follow-up inbound call and predicted date and time.

According to some embodiments of the present disclosure, operation 230 comprising converting the updated status to a voice recording.

According to some embodiments of the present disclosure, operation 240 comprising operating an inbound software to identify an inbound call as a follow-up inbound call of a customer received via a Voice over Internet Protocol (VOIP) network communicating with a mobile device. The customer has an open ticket with an updated status and playing voice recording with the status update in the identified inbound call, thus reducing customers waiting time and agents' workload.

According to some embodiments of the present disclosure, leveraging the work done by agents during non-peak times and utilizing the audio file, e.g., custom audio wav file stored against the open ticket record of the customer in the inbound database. The voice status update may be played i.e., the audio file stored in inbound database against the customer record for the open ticket to the respective customers when they call the contact center for follow-up on their open tickets.

According to some embodiments of the present disclosure, this voice status update may be personalized or customized for example, each customer may get a descriptive update specific to the open ticket and addressing the individual problem. So, the update may be tailored for the customer. In another example, the update may be played in the personal agent's voice, i.e., the voice of the particular agent who has served the customer and with whom the customer has formed a rapport earlier. This may help in facilitating the customer-agent rapport and the customer may feel that the agent is continuing to look-up and work on the ticket, that the issue is being given the right priority.

According to some embodiments of the present disclosure, workflow 200B may be implemented in a system, such as system 100A in FIG. 1A.

According to some embodiments of the present disclosure, even though most of the current contact centers work on and integrate with a Voice Over Internet Protocol (VOIP) network, the VOIP network in system 100A in FIG. 1A and system 100B may be replaced by any type of traditional circuit switched network, such as Integrated Services Digital Networks (ISDN), Wireless networks and the like.

According to some embodiments of the present disclosure, system 100A in FIG. 1A and system 100B in FIG. 1B may be operating over the Public Switched Telephone networks (PSTN) which may have the capability to interconnect with cellular networks and thereby the customer's mobile device. Furthermore, the customer's mobile device, such as customer mobile 114 in system 100A in FIG. 1A may be an example of an end customer device, which may operate over a cellular network and communicate with the contact center VOIP network through interconnections, and it may be replaced with any other communication device, such as landline-phone, IP phone, web browser and the like which may be used to initiate a call.

Figure 3:
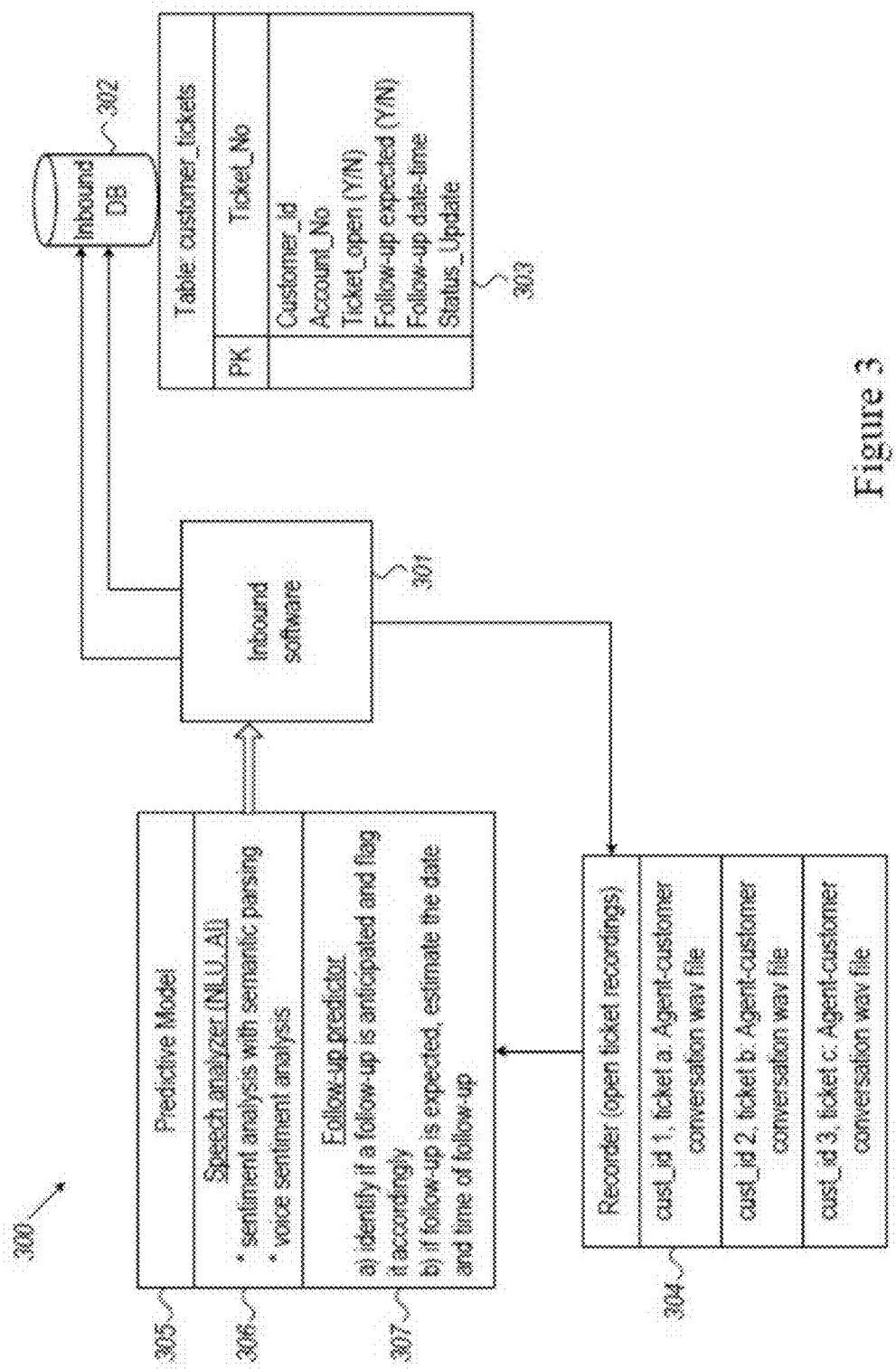
FIG. 3 is a diagram of predictive model interactions with other components in a system for playing a personalized voice recording with a status update to follow-up customer on an inbound call in a contact center, in accordance with some embodiments of the present disclosure.

FIG. 3 is a diagram 300 of predictive model interactions with other components in a system for playing a personalized voice recording with a status update to follow-up customer on an inbound call in a contact center, in accordance with some embodiments of the present disclosure.

According to some embodiments of the present disclosure, for each open ticket with the contact center, the inbound software 301, such as inbound system 101, in FIG. 1A may fetch the ticket_no along with customer_id from inbound database 302, such as inbound database 102 in FIG. 1A. For example, a table, such as table 'customer_tickets' 303 may be stored in the inbound database and include a field that indicates if a follow-up expected and a field for a follow-up date and time.

According to some embodiments of the present disclosure, based on the open ticket number and customer id, an audio file of the latest recording of the customer and agent for the open ticket from the contact center integrated recorder 304 may be fetched. The audio file may be sent to a predictive model 305 to determine whether or not the customer is expected to make a follow-up call, and, if a follow-up is expected, then what would be the estimated date and time that the customer would make a follow-up call to the contact center.

According to some embodiments of the present disclosure, the predictive model may include for example, a speech analyzer 306 and a follow-up predictor module 307. The speech analyzer 306 may perform customer sentiment analysis. It would do so with sentiment analysis via semantic parsing of the conversation in the audio file, after converting the audio file to text-format, as well as direct voice sentiment analysis of the audio file containing the call recording. Both sentiment analysis via semantic parsing and direct voice sentiment analysis processes may augment one another in the process.

According to some embodiments of the present disclosure, the semantic parsing for the semantic parser, a set of pre-defined key phrases may be included in the predictive model 305. There may also be a provision to add or configure more key phrases as required. Providing a configurable option to add key phrases may be required as depending on the type of business, supervisors or administrators of the contact center may need to define more key phrases into the system to more accurately decipher the customer sentiment so as to identify whether or not the customer would make a follow-up call to the contact center and the predicted date and time.

According to some embodiments of the present disclosure, key phrases may be pre-defined and made available for both the customer speech and agent speech, i.e., for both sides of the conversation and a configurable option may be provided to supervisors or administrators to add phrases for both sides.

According to some embodiments of the present disclosure, during the semantic parsing of a conversation in the audio file 304, for each match of a key phrase, the speech analyzer 306 may increase the count of matches by 1. This counter may be a 'key_phrase_counter' and may include matches from both customer speech and agent speech.

According to some embodiments of the present disclosure, the speech analyzer 306 may also separately catch and mark key phases from the customer speech, where the customer insists on closure or problem resolution by a particular date and/or time and/or number of hours. It may also catch key phrases from agent speech where the agent commits for a closure or asks the customer to call-back by a particular date and/or time and/or number of hours.

According to some embodiments of the present disclosure, this additional and separate traction of key phrases containing date and/or time and/or number of hours may be for the purpose of identifying the approximate date and time that the customer would make a follow-up call. The key phrases containing date and/or time and/or number of hours from customer speech, for example, such as customer key phrases 410 in FIG. 4 or agent speech, for example, such as agent key phrases 420 in FIG. 4 may also be part of the 'key_phrase_counter'. The key_phrase_counter may be a super-set that may contain all the key phrases indicating a possibility of follow-up, with and without phrases containing date and/or time and/or number of hours.

According to some embodiments of the present disclosure, the direct voice sentiment analysis may use existing methods to perform voice sentiment analysis to identify different emotions like anger, sadness, sarcasm, boredom, neutral etc. by analyzing the loudness, pitch, modulation and other factors in the audio. Two more emotions would be added mainly to identify whether the customer would make a follow-up call in a preconfigured period, 'restlessness' and 'urgency'. The speech analyzer 306 may then provide its output of the customer sentiment from semantic parsing and direct voice sentiment analysis to a follow-up predictor 307. The Follow-up predictor may aggregate the output received from keyword matches i.e., sentiment analysis via semantic parsing, and direct voice sentiment analysis.

According to some embodiments of the present disclosure, the follow-up predictor 307 may then predict whether or not the customer is going to make a follow-up call to the contact center. The follow-up predictor 307 may also calculate and put an estimate of date and time when the customer would likely make a follow-up call. If the follow-up predictor 307 may have predicted a record and flagged it for follow-up call but from analysis of the output from speech analyzer 306, the follow-up predictor 307 may have not been able to estimate a date-time when the follow-up is expected, then it may default to a preconfigured estimated follow-up date-time. This configurable option to set the default estimated follow-up date-time may be provided to users such as supervisors of the contact center. For example, the preconfigured estimated follow-up date and time may be within 24 hours from the call.

According to some embodiments of the present disclosure, the predicted output of the follow-up predictor may be sent to an inbound system, such as inbound system 301 and such as inbound system 101 in FIG. 1A. The Inbound system 301 may enter the data for the follow-up fields for the particular open ticket of the customer into the inbound database, such as inbound database 302 and such as inbound database 102 in FIG. 1A. For example, the data for follow-up fields may be the 'follow-up expected: 'Yes/No' and the 'follow-up date-time fields', as shown as part of 'customer_tickets' table 303 of the inbound database 302.

Figure 4:
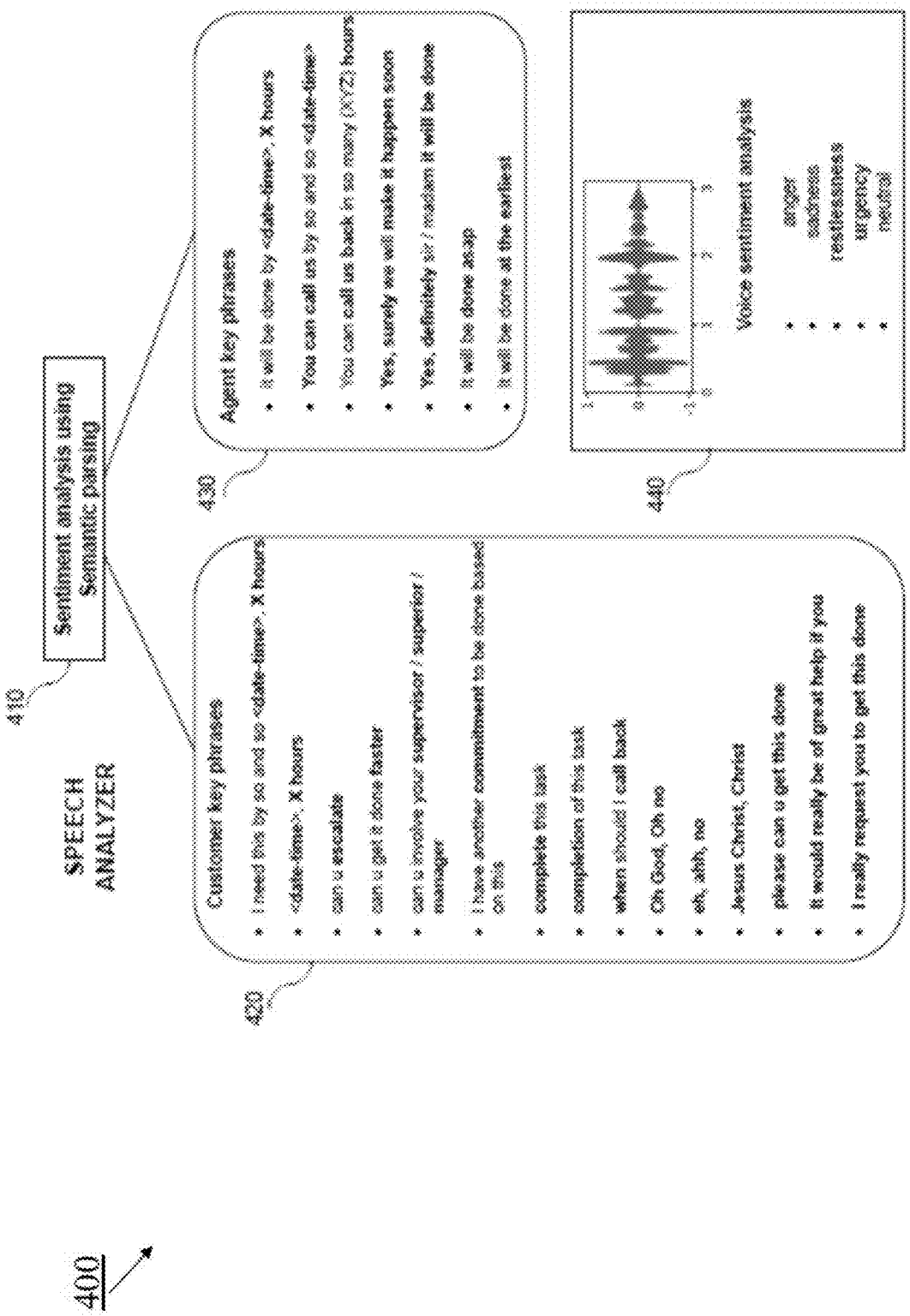
FIG. 4 is an example of sentiment analysis in a system for playing a personalized voice recording with a status update to follow-up customer on an inbound call in a contact center, in accordance with some embodiments of the present disclosure.
Figure 5A:
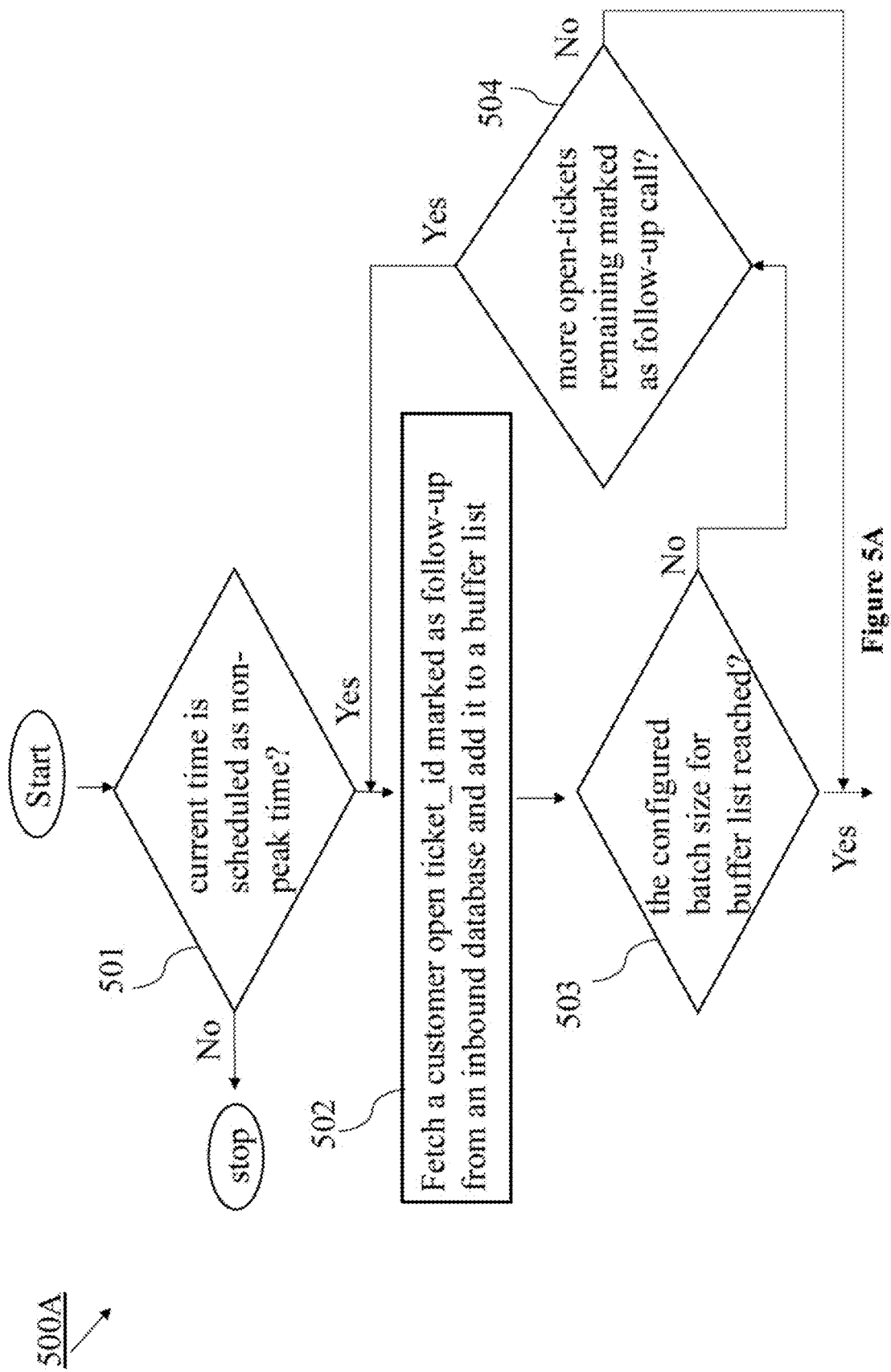
Figure 5D:
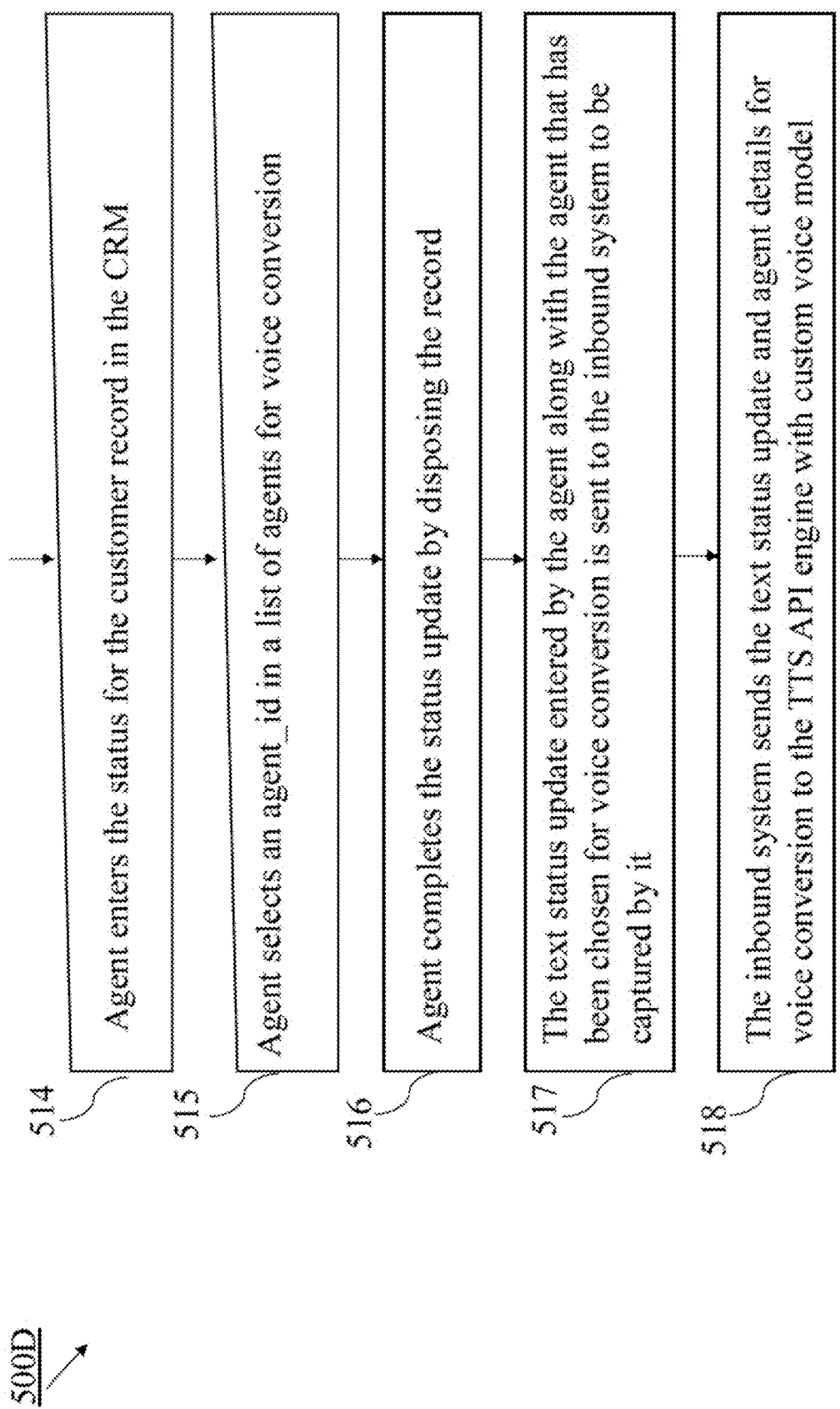
Figure 5E:
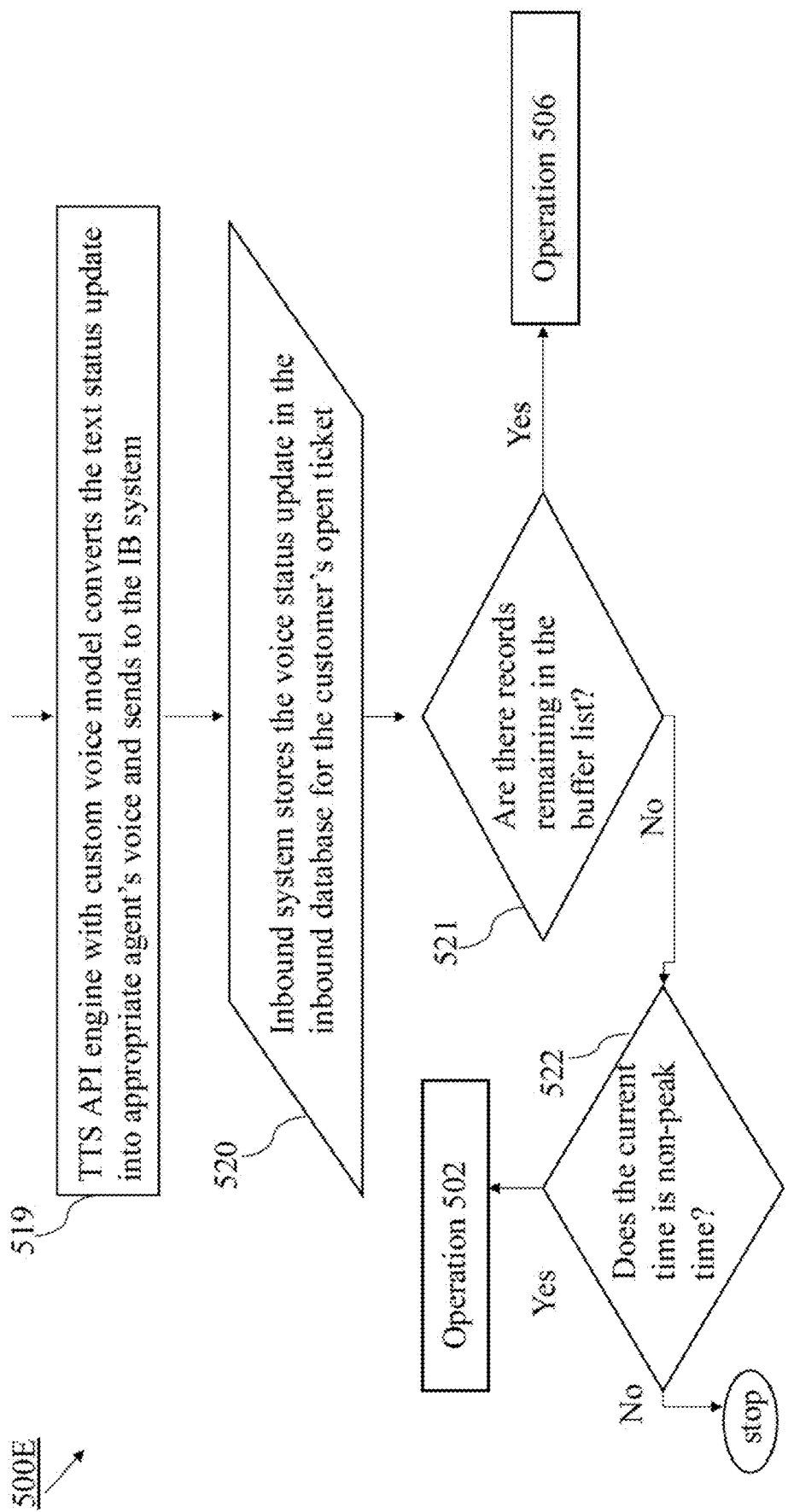

FIG. 4 is an example 400 of sentiment analysis in a system for playing a personalized voice recording with a status update to follow-up customer on an inbound call in a contact center, in accordance with some embodiments of the present disclosure.

According to some embodiments of the present disclosure, a speech analyzer may use a sample of key phrases 420 from customer speech and agent speech 430 for sentiment analysis via semantic parsing. The speech analyzer may also analyze emotions through direct voice sentiment analysis 440.

According to some embodiments of the present disclosure, in a system such as system 100A in FIG. 1A a predictive model, such as predictive model 305 in FIG. 3 may use a speech analyzer 306, which would perform sentiment analysis using semantic parsing.

According to some embodiments of the present disclosure, the speech analyzer 306 in FIG. 3 may operate direct voice sentiment analysis which may yield sentiments such as anger, sadness, restlessness, urgency and neutral.

According to some embodiments of the present disclosure, optionally, the speech analyzer 306 may operate sentiment analysis using semantic parsing and direct voice sentiment analysis to arrive at a prediction for follow-up where both methods may augment one another. For example, by an average from both methods, or there may be other methods as well to augment.

FIG. 5A-5E is a high-level flowchart of playing a personalized voice recording with a status update to follow-up customer on an inbound call in a contact center, in accordance with some embodiments of the present disclosure.

According to some embodiments of the present disclosure, after a model, such as predictive model 305 in FIG. 3, has flagged a subset of open-tickets as open tickets which are anticipated for follow-up call, the following operations may occur in a system such as system 100A in FIG. 1A, during time that may have been identified as non-peak hours or preconfigured by users as such.

According to some embodiments of the present disclosure, checking if current time is scheduled as non-peak time 501. When it has been scheduled as non-peak time, an inbound system, such as inbound system 101 in FIG. 1A may fetch a customer's open_ticket record from an inbound database and add it to a buffer list 502.

According to some embodiments of the present disclosure, the open_ticket record may be stored in the inbound database, such as inbound database 102 in FIG. 1A in a table containing repository of currently open tickets of all customers and which were marked or flagged for follow-up call, e.g., table 303 in FIG. 3, by the model, such as predictive model 305 in FIG. 3. The record may include ticket_no, cust_id, phone_no, follow-up expected, follow-up date and time fields, and other fields.

According to some embodiments of the present disclosure, the customer record with key fields may be added to a buffer list based on the predicted date and time of follow-up inbound call. The buffer list is a pool of open_tickets marked for follow-up call and is intended to be in-memory as compared to the larger set of records marked for follow-up and residing in the database. This is to improve the efficiency of the process to run through a loop and process a smaller chunk of customer records marked for follow-up at a time. Once the customer records in the buffer list are processed and exhausted, the buffer list may be refilled with the next chunk of records and so on.

According to some embodiments of the present disclosure, the size of the buffer list may be preconfigured. For example, a supervisor can choose a buffer list batch size of 25, which means, that the buffer can hold in-memory up to 25 records of open_tickets marked for follow-up call.

According to some embodiments of the present disclosure, checking if the configured batch size for buffer list reached 503 and if the batch size for buffer list has not reached then checking if there are more open-tickets remaining in the inbound database which are marked as follow-up call 504 and if there are then, repeating operations 502-504, i.e., fetching an open_ticket marked as follow-up call from the database to the buffer list in memory until there are no more open_tickets remaining marked as follow-up call or the buffer list has reached its preconfigured size.

According to some embodiments of the present disclosure, checking if there is at least one customer record in the buffer list 505, since there is a possibility that there are no open tickets on which follow-up call was anticipated by the predictive model, such as predictive model 305 in FIG. 3.

According to some embodiments of the present disclosure, when there is at least one record of an open ticket in the buffer list, then sorting the records in ascending order of estimated follow-up date and time in the buffer list 506, such that the record for which follow-up call is expected to be the earliest is placed at the top of the buffer list.

According to some embodiments of the present disclosure, initializing the first record from the sorted list for processing 507, i.e., the record for which follow-up is expected to occur before any other record in the buffer list.

According to some embodiments of the present disclosure, apply a preconfigured routing method and identify the agent to be assigned for status update of the open ticket 508. The preconfigured routing method may be for example, routing the record to the same original agent when all customer calls related to the open ticket have been handled by the same agent. In another example, when the calls pertaining to the customer's open ticket were handled by multiple agents, then routing the record to the last agent who handled the customer call on the open ticket. In yet another example, when the calls pertaining to the customer's open ticket were handled by multiple agents, then routing the record to the agent who has the highest satisfaction score with customer that is related to the open ticket amongst multiple interactions that the customer has had with different agents on the current open ticket.

According to some embodiments of the present disclosure, in yet another example, when the calls pertaining to the customer's open ticket were handled by multiple agents, then routing the record to the agent who has the highest satisfaction score with this particular customer amongst multiple interactions the customer has had with different agents across all of the previously closed tickets of this customer. A historical check on the customer tickets may be performed to identify the best agent for this purpose.

According to some embodiments of the present disclosure, the identified agent that the record of the open ticket may be routed to may be the agent that is expected to enter a text status update for the customer's open ticket.

According to some embodiments of the present disclosure, the inbound system 101 in FIG. 1A may send the ticket_id, cust_id, agent_id of the identified personal agent and other key data fields to the CRM application 509 for further details to be retrieved from the CRM application. The CRM application would then fetch further details of the customer record from its own database of from another table of the inbound database, depends on whether the CRM application is external and uses its own database or if it is integrated and uses the inbound database itself for its data. The retrieved details may be forwarded to the identified agent to be presented via CRM UI screen.

According to some embodiments of the present disclosure, the inbound system, such as inbound system 101 in FIG. 1A may check if the identified agent is currently available 510 to take the customer record for entering the status update.

According to some embodiments of the present disclosure, when the agent is not available, then the inbound system may mark another appropriate agent to send this customer record 511. The inbound system may select another agent that has the same skill and who can work on entering the status update on the open ticket.

According to some embodiments of the present disclosure, when the identified agent is available, the inbound system 101 in FIG. 1A may mark that agent to send this customer record to 512 and may signal the CRM application to send the open ticket data along with customer details to the agent to be presented to the agent via the CRM UI screen.

According to some embodiments of the present disclosure, operating an inbound software to route customer records marked as predicted for follow-up inbound call and predicted date and time thereof to one or more agents 513. The signaling to the CRM application, such that the CRM UI screen with details of the open ticket and customer details may be presented to the identified agent may be operated by the inbound system 101 in FIG. 1A by making a 'dummy inbound call' on behalf of this customer.

According to some embodiments of the present disclosure, the 'dummy inbound call' may be a process of the inbound system 101 in FIG. 1A to facilitate the assignment of the identified agent and to present the customer data for open ticket to an agent. The inbound system may signal the integrated CRM application to send the open ticket data for the customer along with customer details to the agent on CRM UI screen. The CRM UI screen may include the 'status update' and 'agent_id' fields for voice conversion.

According to some embodiments of the present disclosure, the agent may enter the status for the customer record in the CRM 514 via the CRM UI screen. The agent may check the contact center database, internal or integrated applications, collaborate with partners through internal apps, or consult with a supervisors and/or other internal stakeholders involved in solving the customer issue as necessary, and then the agent may enter a cumulative text update in the 'status update' field of the CRM UI screen with the information related to the open ticket status. After the agent has received the status of the open ticket from one or more users or retrieved it from one or more applications and entered the status in text format, the agent may select an agent_id in a list of agents for voice conversion 515 of the text status update entered by the agent.

According to some embodiments of the present disclosure, the 'agent_id for voice conversion' dropdown box on the CRM UI screen may be pre-populated with the agent_id of the current agent who has the customer data on the CRM UI screen. The agent may leave this field as is. This pre-populated agent_id is the one which the inbound system has selected as the personal agent for the customer's open ticket marked for follow-up. The agent_id may be changed if upon another business reason.

According to some embodiments of the present disclosure, the agent may complete the status update by disposing the record 516 on the CRM UI screen.

According to some embodiments of the present disclosure, the text status update entered by the agent along with the agent that has been chosen for voice conversion may be sent to the inbound system to be captured by it 517 and stored in the inbound database, such as inbound database 102 in FIG. 1A.

According to some embodiments of the present disclosure, the inbound system, such as inbound system 101 in FIG. 1A may send the text status update and agent details for voice conversion to the TTS API engine with custom voice model 518. The Inbound system may send the text status update along with the agent_id for voice conversion to the TTS API engine with custom voice model. This TTS API engine is capable of voice cloning and it was trained with several audio samples of multiple agents in the contact center, such that it may be able to generate speech in the voice of any particular agent in the contact center.

According to some embodiments of the present disclosure, the TTS API engine with custom voice model converts the text status update into appropriate agent's voice and sends to the inbound system 519. The TTS API engine with custom voice model and voice cloning capabilities may convert the text status update into speech status update in the voice of the particular agent that was provided in the 'agent_id for voice conversion' field.

According to some embodiments of the present disclosure, the inbound system may store the voice status update in the inbound database for the customer's open ticket 520. The Inbound system may store the converted voice status update as an audio file, such as wav file in the inbound database, for example, in the customer_tickets table.

According to some embodiments of the present disclosure, the inbound system may check if there are records remaining in the buffer list 521. If there are remaining records, then steps 506 to 520 may be repeated, by picking up the next open ticket record from the buffer list.

According to some embodiments of the present disclosure, when there are no further records in the buffer list then it may check if the current time is non-peak time 522, if it is then it may operate operation 502, otherwise the process may be stopped.

Figure 6:
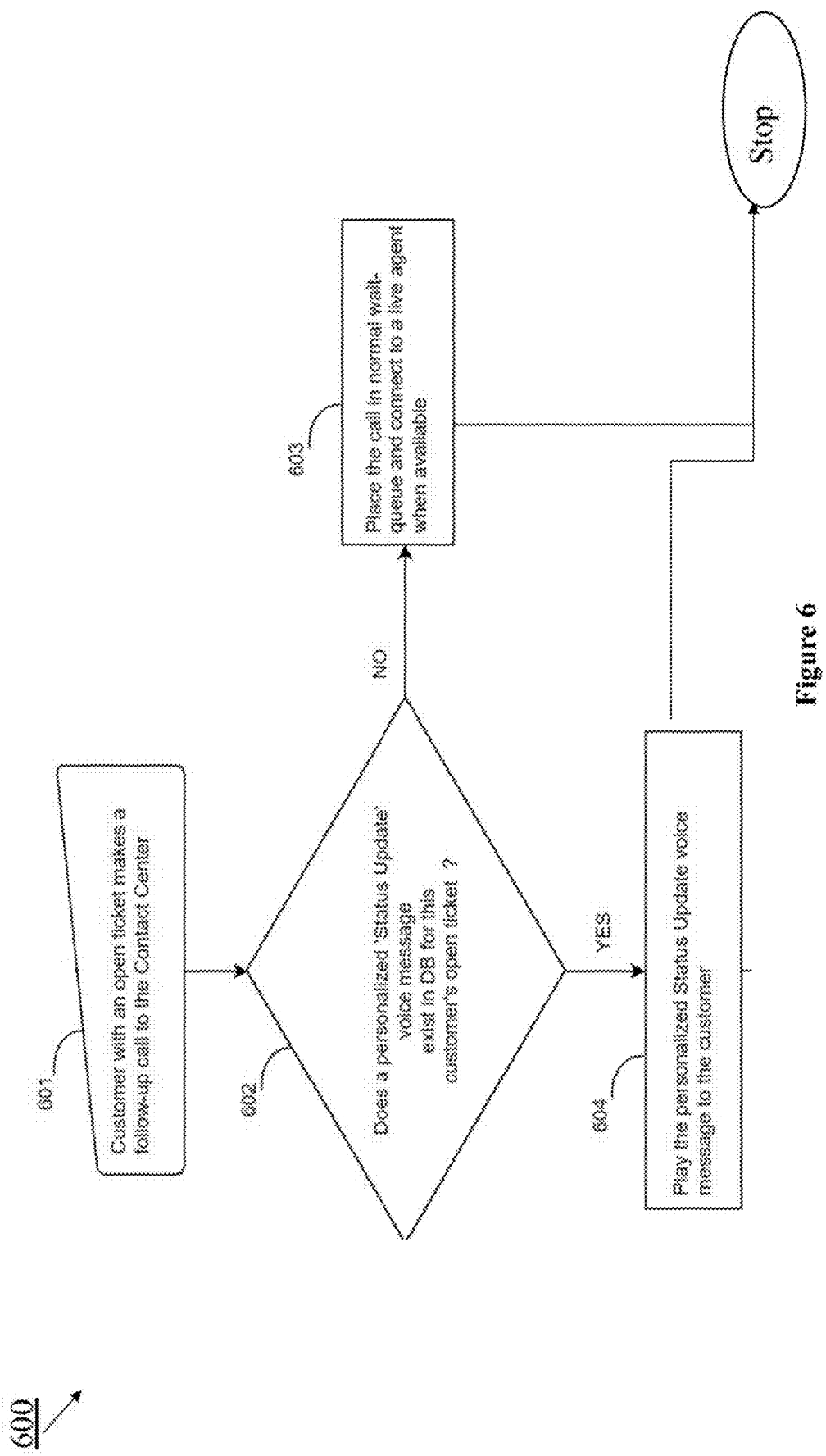
FIG. 6 is a high-level flowchart 600 of playing a personalized voice recording with a status update to a customer with an open ticket making a follow-up call, in accordance with some embodiments of the present disclosure.

FIG. 6 is a high-level flowchart 600 of playing a personalized voice recording with a status update to a customer with an open ticket making a follow-up call, in accordance with some embodiments of the present disclosure.

According to some embodiments of the present disclosure, once a customer with an open-ticket makes a follow-up call to the contact center 601 for an update as to the status of the subject of the open ticket, an inbound system, such as inbound system 101 in FIG. 1A may check in an inbound database, such as inbound database 102 in FIG. 1A, if there is a personalized status update in a voice recording file e.g., an audio file, that is stored in the inbound database, for the customer 602 based on identification of the customer.

According to some embodiments of the present disclosure, the customer identification may be based for example, on Automatic Number Identification (ANI), customer account number, Social Security Number (SSN) or credit card number, as shown in FIGS. 8B-8E.

According to some embodiments of the present disclosure, when there is no audio file stored in the inbound database, the call of the customer may be placed in a wait-queue to be connected to an available agent 603. When there is an audio file with status update as to the open ticket of the customer stored in the inbound database, then playing the personalized status update voice message to the customer 604. Thus, reducing customers waiting time and agents' workload.

According to some embodiments of the present disclosure, an audio file with a status update may be generated by a conversion of a text status update that has been entered by an agent during non-peak time.

According to some embodiments of the present disclosure, the non-peak time when the agent enters the status update and peak time when the customer may call for follow-up may occur within the same day. Even if there is a gap of more than a day or couple of days, the record may be re-routed each day during non-peak time for the agent to check or change the status update. The record may be re-routed more than once per day based on preconfigured settings thereof. By the time the customer follow-up call actually happens, the Status Update is expected to be the most updated.

According to some embodiments of the present disclosure, optionally, the routing of records to agents may be configured to be a preconfigured period, e.g., X hours before the marked follow-up date and time.

Figure 7:
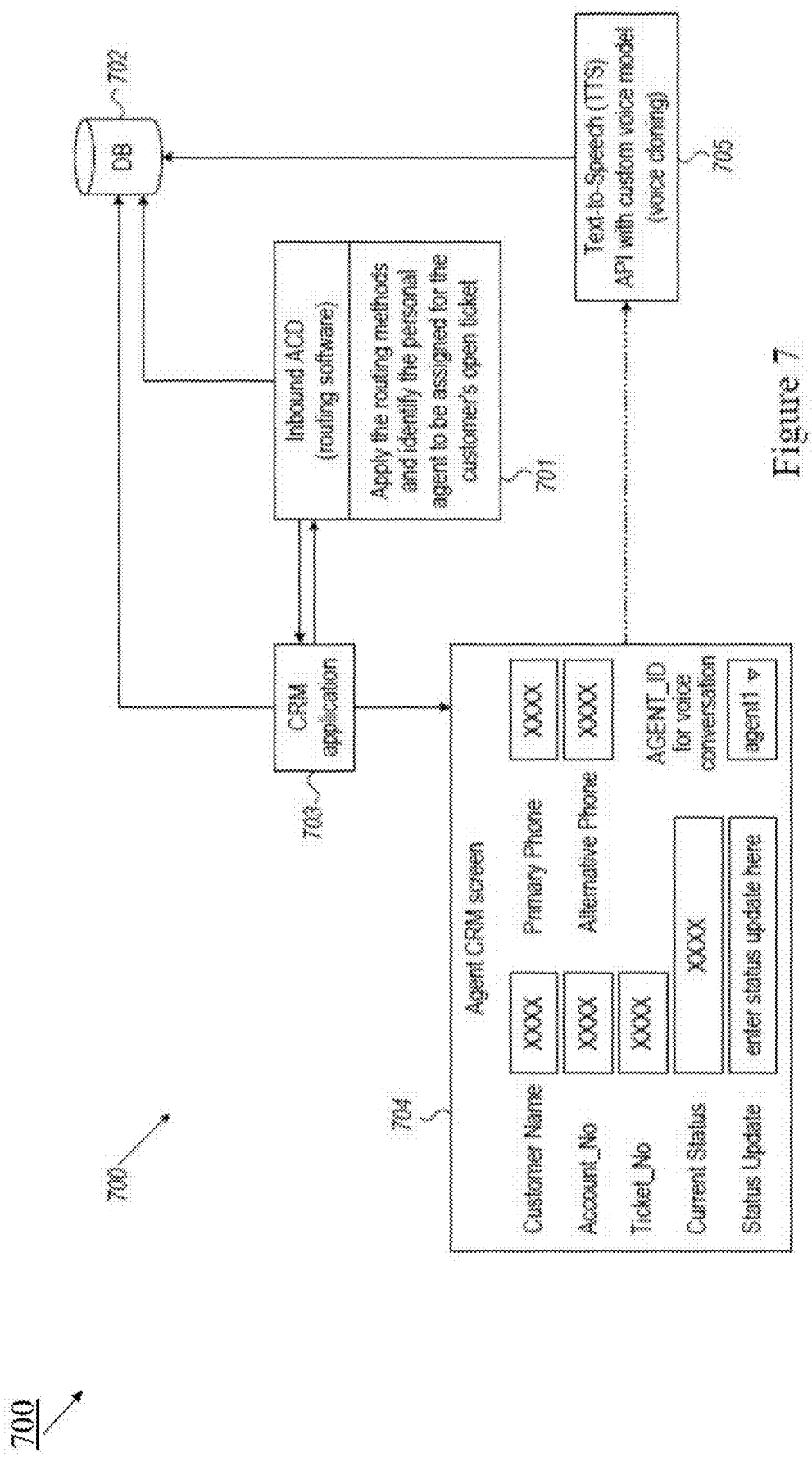
FIG. 7 is a diagram 700 of status update of an open ticket in a system for playing a personalized voice recording with a status update to follow-up customer on an inbound call in a contact center, in accordance with some embodiments of the present disclosure.

FIG. 7 is a diagram 700 of status update of an open ticket in a system for playing a personalized voice recording with a status update to follow-up customer on an inbound call in a contact center, in accordance with some embodiments of the present disclosure.

According to some embodiments of the present disclosure, during preconfigured non-peak times, the inbound system 701, such as inbound system 101 in FIG. 1A may present only the data of different customer records to the agents on their CRM UI screen 704 via a CRM application 703. These will be customer records on which there is an open ticket and where a follow-up was anticipated as per the predictive model, such as predictive model 305 in FIG. 3. The customer records may be retrieved from a database, such as database 702 and such as database 102 in FIG. 1A and routed to the agents by existing methods used to route only the customer records to the CRM UI screen 704 for the agent without a real customer on call.

According to some embodiments of the present disclosure, the customer records which may be routed to the agents are records which were marked as 'follow-up expected' by the predictive model, such as predictive model 305 in FIG. 3.

According to some embodiments of the present disclosure, customer records may be routed to agents during non-peak times based on different conditions and business need. For example, when the calls pertaining to the customer's open ticket were handled by the same agent till now, then the customer record may be routed to the same original agent who has served the customer till now.

According to some embodiments of the present disclosure, in another example, when the calls pertaining to the customer's open ticket were handled by multiple agents till now, then the customer record may be routed to the 'last agent' who handled the customer call on the open ticket. In yet another example, when the calls pertaining to the customer's open ticket were handled by multiple agents till now, then the customer record may be routed to the agent who has the 'highest satisfaction score' with this particular customer amongst multiple interactions the customer has had with different agents on the current open ticket.

According to some embodiments of the present disclosure, in yet another example, when the calls pertaining to the customer's open ticket were handled by multiple agents till now, then the customer record may be routed to the agent who has the 'highest satisfaction score' with this particular customer amongst multiple interactions the customer has had with different agents across all of the previously closed tickets of this customer. A historical check on the customer tickets may be performed to identify the best agent for this purpose.

According to some embodiments of the present disclosure, the inbound system, such as inbound system 701 which may be integrated with a CRM application 703 may be implemented to support routing of customer record to distribute customer records, only to agents during non-peak times.

According to some embodiments of the present disclosure, users, such as supervisors may switch between one method of routing to another based on agent staffing and operational needs. Regardless of the method used for routing, the order in which customer records may be routed to each identified agent on the CRM UI screen 704 may be based on the estimated follow-up date-time, as stored in the database 702 upon the predictive module analysis.

According to some embodiments of the present disclosure, the order of the records that may be routed may be in an ascending order of estimated follow-up date-time. This is because the record with the earliest follow-up date-time is related to the customer that is expected to call the contact center before the other customers to ask for an update on the open ticket.

According to some embodiments of the present disclosure, the agents may enter a text, status update in the Status Update field of the customer record on the CRM screen 704 and dispose the record. The inbound system 701 which presents the customer record to the agent on the CRM screen 704 may also integrate with a Text-to-Speech (TTS) API with custom voice model (voice cloning) 705 e.g., with AI-powered voice cloning technology. Such a TTS API 705 may be implemented as a plugin to the inbound system 701.

According to some embodiments of the present disclosure, the TTS (Text-to-Speech) API 705 may read the text Status Update for a customer's open ticket record disposed by the agent and may convert this text into 'custom' speech in the particular agent's voice, i.e., the voice of the agent that was selected in the 'AGENT_ID for voice conversion' field in the CRM screen 704.

According to some embodiments of the present disclosure, for the conversion of the text to voice, the TTS API 705 may operate a custom voice model, i.e., AI-powered voice cloning capabilities. The custom voice model is a Text-to-Speech feature that allows to train a custom voice model using different targeted studio-quality audio recordings.

According to some embodiments of the present disclosure, for having the speech synthesized in a particular agent's voice, the custom voice model may be trained with audio recording samples of all agents in the contact center. The TTS API 705 with custom voice model would then be capable of playing the Status Update to customers in the specific agent's voice.

Figure 8A:
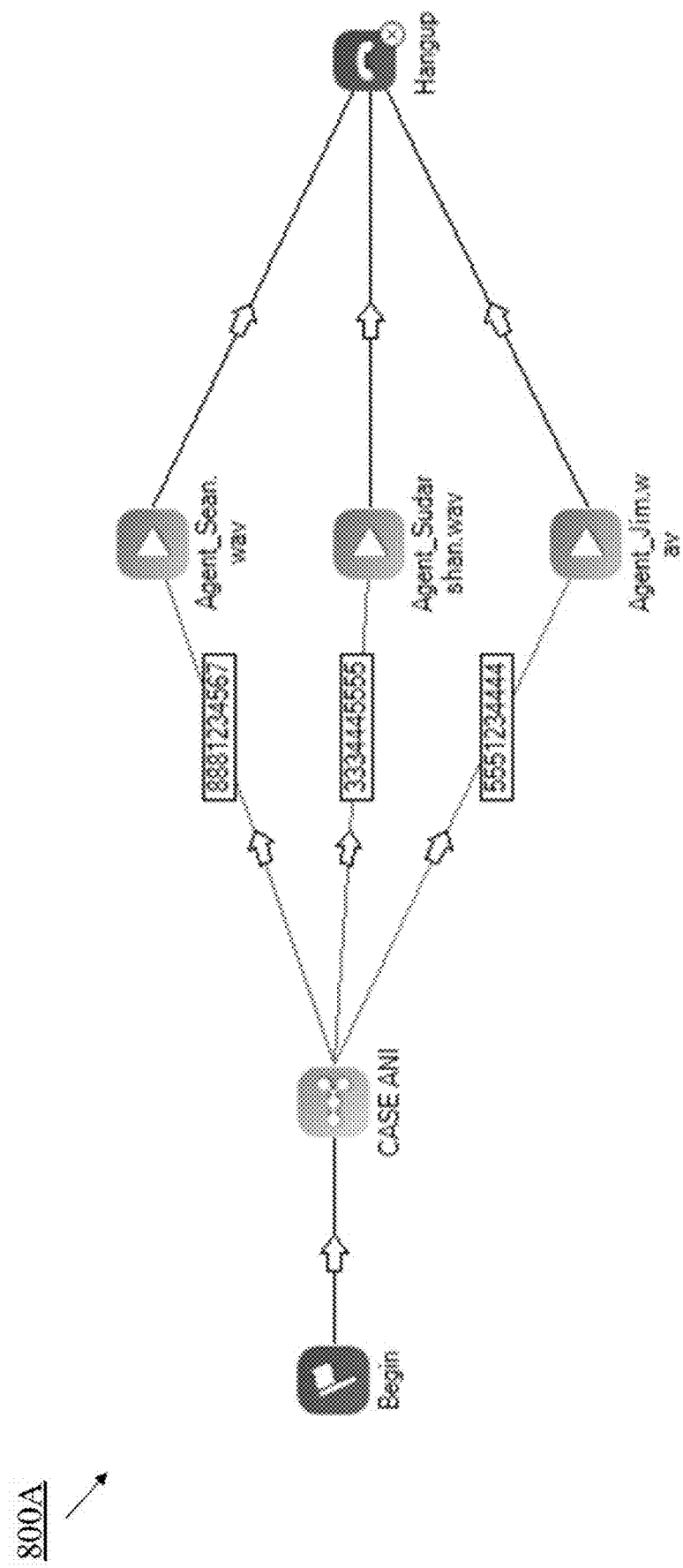
FIGS. 8A-8E are simulations of playing a personalized voice recording with a status update to follow-up customer on an inbound call in a contact center, in accordance with some embodiments of the present disclosure.

FIG. 8A is a simulation of playing a personalized voice recording with a status update to follow-up customer on an inbound call in a contact center, in accordance with some embodiments of the present disclosure.

According to some embodiments of the present disclosure, in a system, such as system 100A in FIG. 1A personalized agent messages may be played to customers directly on the basis of customer phone number. The customer phone number may appear in the Automatic Number Identifier (ANI) field when the customer calls the contact center.

Figure 8B:
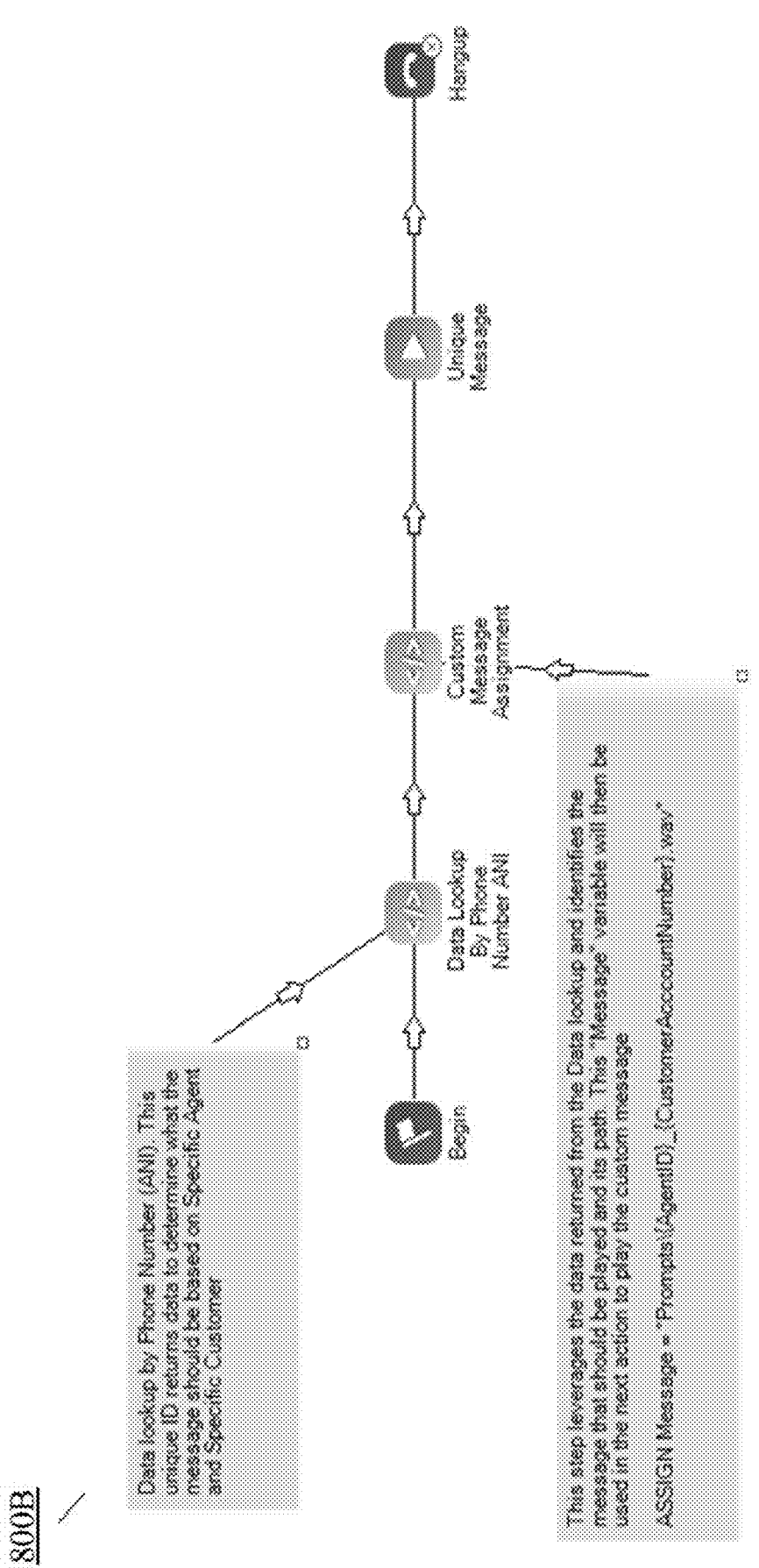

FIG. 8B is a simulation of playing a personalized voice recording with a status update to follow-up customer on an inbound call in a contact center, in accordance with some embodiments of the present disclosure.

According to some embodiments of the present disclosure, in a system, such as system 100A in FIG. 1A an integration to lookup the customer record in a database, such as database 102 in FIG. 1A and such as database 702 in FIG. 7, based on phone number received in ANI field on the inbound call, may determine which agent is assigned to the customer account and accordingly may fetch and play the right personalized voice message to the customer on a follow-up call.

Figure 8C:
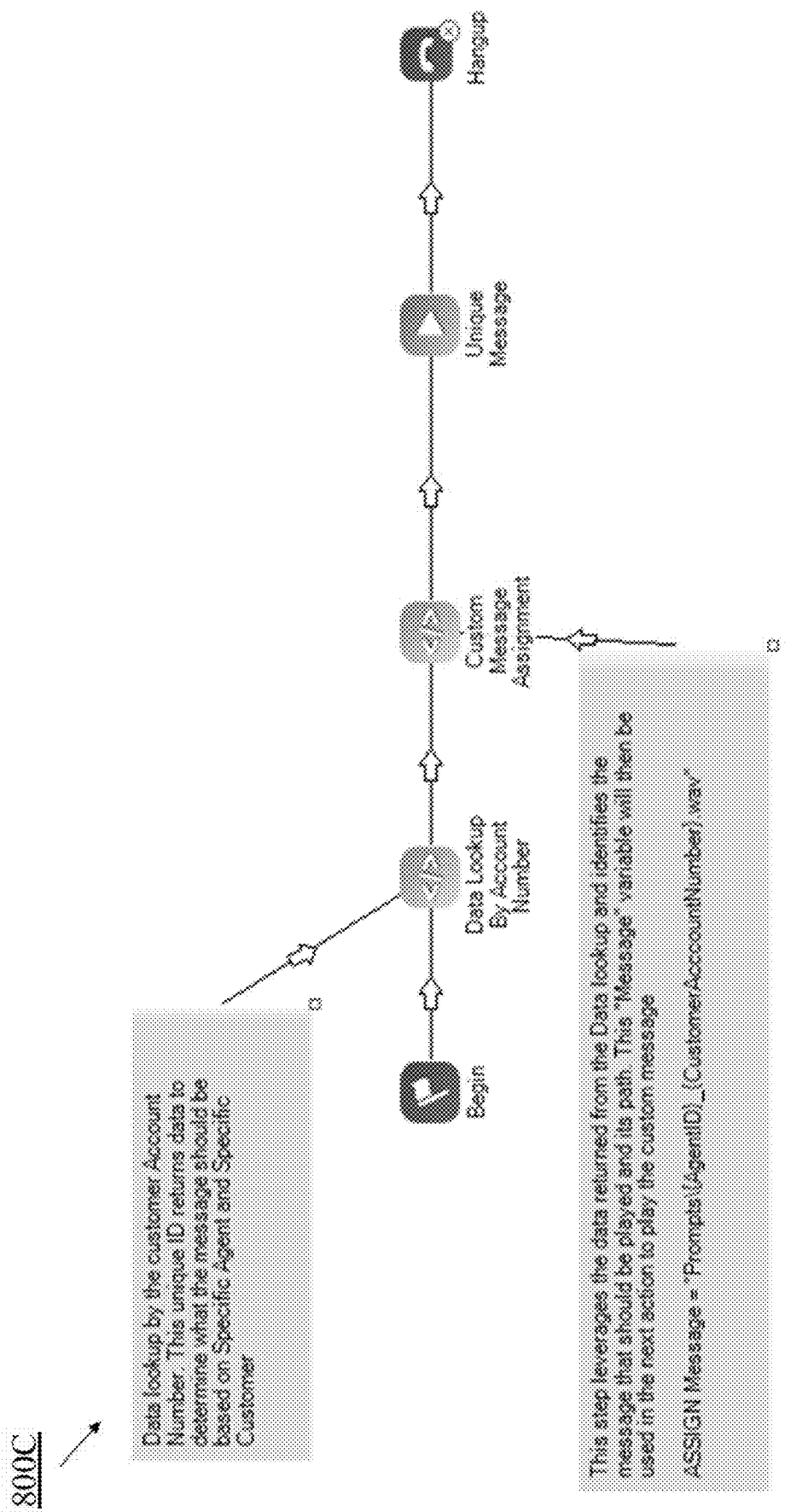

FIG. 8C is a simulation of playing a personalized voice recording with a status update to follow-up customer on an inbound call in a contact center, in accordance with some embodiments of the present disclosure.

According to some embodiments of the present disclosure, in a system, such as system 100A in FIG. 1A an integration to lookup the customer record in a database, such as database 102 in FIG. 1A based on customer's account number received on the inbound call, may determine which agent may be assigned to the customer account and accordingly may fetch and play the right personalized voice message to the customer on the follow-up call.

Figure 8D:
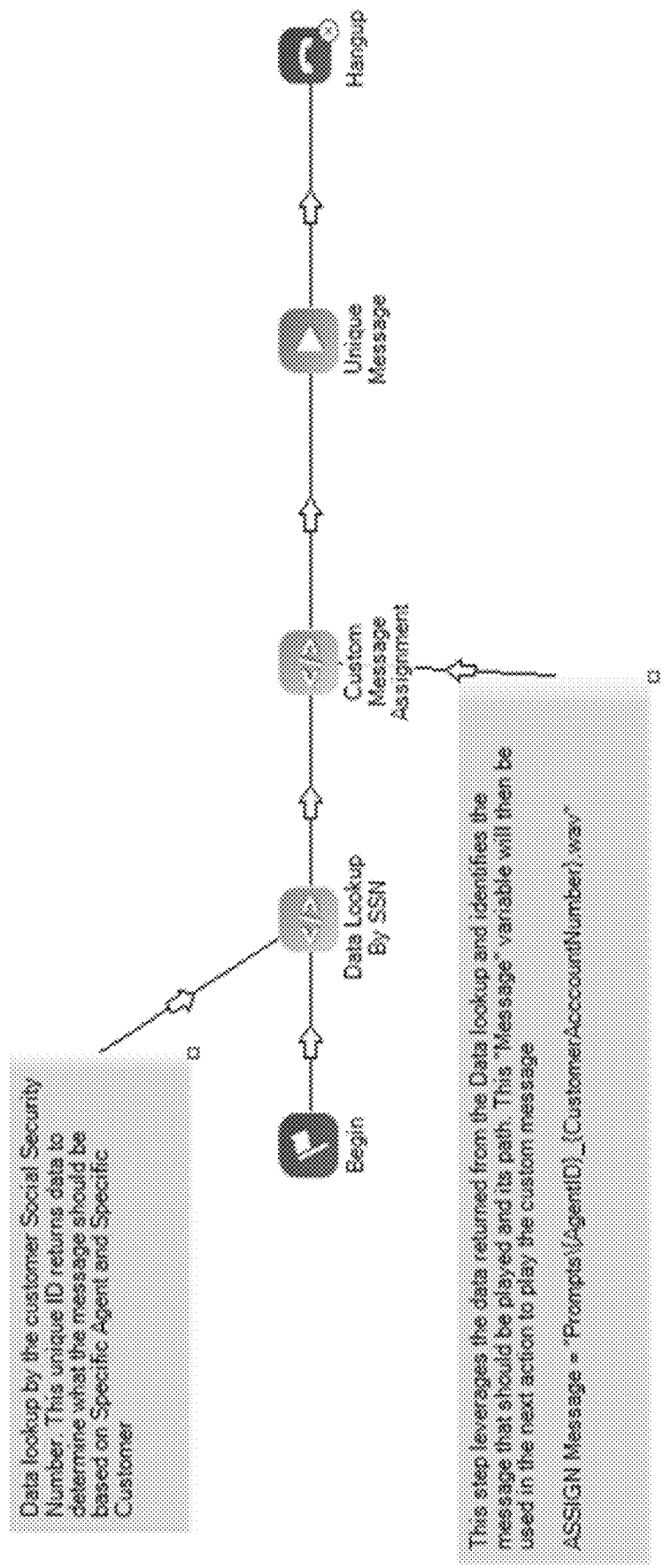

FIG. 8D is a simulation of playing a personalized voice recording with a status update to follow-up customer on an inbound call in a contact center, in accordance with some embodiments of the present disclosure.

According to some embodiments of the present disclosure, in a system, such as system 100A in FIG. 1A an integration to lookup the customer record in a database, such as database 102 in FIG. 1A, based on customer's Social Security Number (SSN) received on the inbound call, may determine which agent is assigned to the customer account and accordingly may fetch and play the appropriate personalized voice message to the customer on the follow-up call.

Figure 8E:
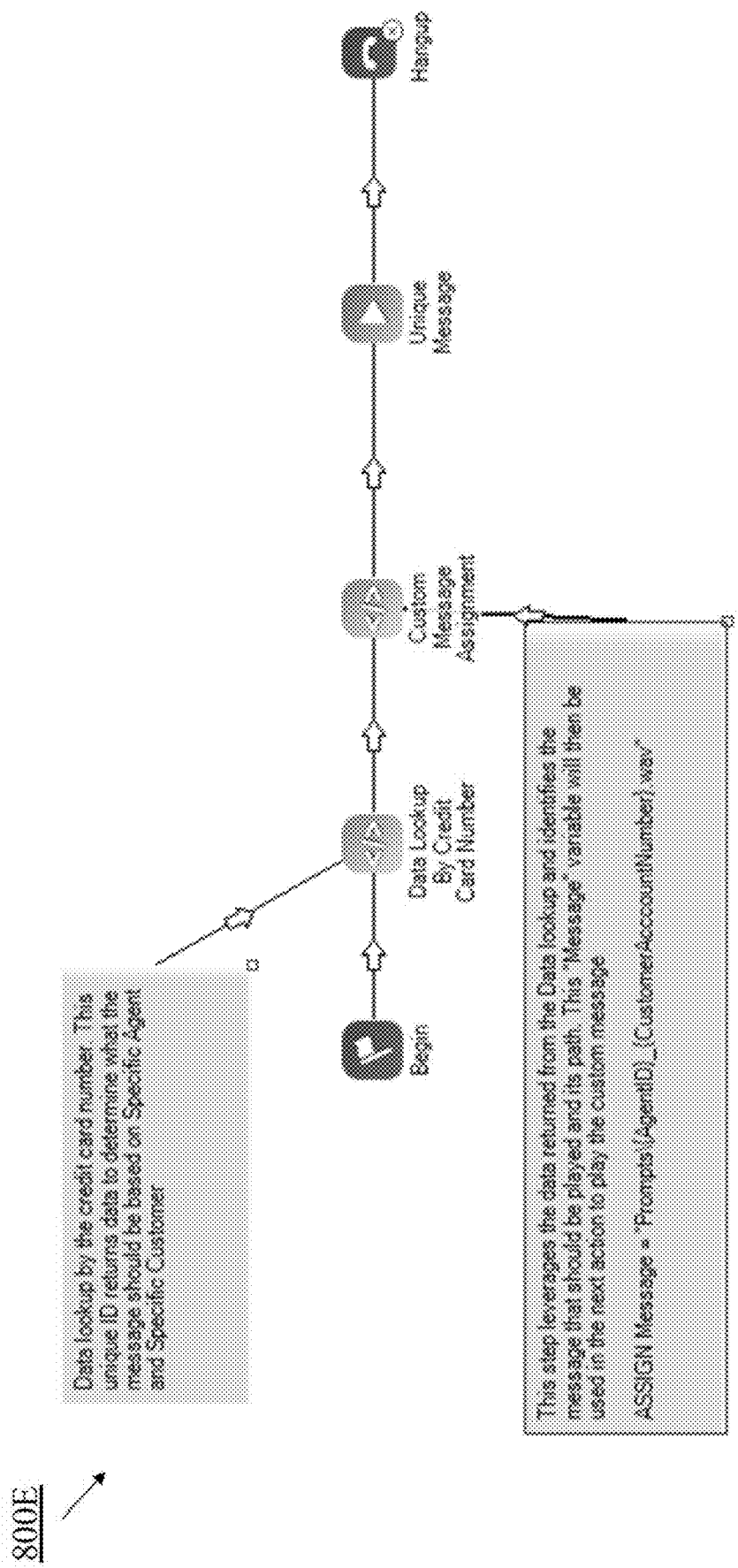

FIG. 8E is a simulation of playing a personalized voice recording with a status update to follow-up customer on an inbound call in a contact center, in accordance with some embodiments of the present disclosure.

According to some embodiments of the present disclosure, in a system, such as system 100A in FIG. 1A an integration to lookup the customer record in a database, such as database 102 in FIG. 1A, based on customer's credit card number received on the inbound call, may determine which agent is assigned to the customer account and accordingly may fetch and play the right personalized voice message to the customer on the follow-up call.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computer-implemented method for playing a personalized voice recording with a status update to follow-up customer on an inbound call in a contact center comprising:
   marking one or more open tickets as predicted for follow-up inbound call and predicted date and time for the follow-up call in an inbound database;
   updating status of one or more open ticket marked as predicted for follow-up inbound call and predicted date and time,
   wherein said updating of the status of the one or more open tickets is operated by:
   (i) operating an inbound software to route customer records marked as predicted for follow-up inbound call and predicted date and time thereof to one or more agents,
      wherein the customer records are routed to an agent that is one of: a. agent who has handled the customer open ticket, and b. agent of one or more agents related to the open ticket, and
   (ii) receiving a status of the open ticket from an agent of the one or more agents via a computerized device of the agent and storing the status as a status update in the routed customer record of the customer records in the inbound database via a Customer Relationship Management (CRM) application that is communicating with the computerized device of the agent,
   converting the updated status to a voice recording, and storing the voice recording in the inbound database,
   wherein the converting of the updated status to the voice recording is operated by a Text To Speech (TTS) Application Programming Interface (API) engine having custom voice Artificial intelligence (AI) capabilities, and the voice recording includes voice of the agent, and operating an inbound software to identify an inbound call as a follow-up inbound call of a customer received via a Voice over Internet Protocol (VOIP) network communicating with a customer's mobile device,
wherein the customer has an open ticket with the updated status and playing the voice recording with the status update thus reducing customers waiting time and agents' workload.

2. The computer-implemented method of claim 1, wherein the marking as predicted for follow-up of the one or more open tickets is operated by:
operating the inbound software to retrieve one or more open tickets of customers from an inbound database;
for each open ticket in the one or more open tickets:
retrieving recording related to last interaction of the open ticket;
operating a predictive model on the retrieved recording to predict a follow-up inbound call and predicted date and time thereof for the open ticket; and
sending the predicted follow-up inbound call and predicted date and time thereof to the inbound software to store the follow-up inbound call and predicted date and time thereof in the inbound database.

3. The computer-implemented method of claim 2, wherein the predictive model predicts the follow-up inbound call and predicted date and time thereof by:
operating a speech analyzer module to perform sentiment analysis via semantic parsing and voice sentiment analysis of the retrieved recording; and
operating a follow-up predictor module to predict a follow-up call to the contact center and related date and time.

4. The computer-implemented method of claim 1, wherein the status of the open ticket received from the agent has been provided by one or more users or retrieved from one or more applications.

5. The computer-implemented method of claim 1, wherein the customer records are routed based on the predicted date and time of follow-up inbound call.

6. The computer-implemented method of claim 1, wherein the customer records are routed to one or more agents during non-peak times in the contact center based on availability of the one or more agents.

7. The computer-implemented method of claim 1, wherein the agent is one of: a. agent that handled the customer open ticket so far; b. last agent that handled the customer open ticket, c. agent which has highest satisfaction score from all agents related to the open ticket, d. agent which has highest satisfaction score from all agents that handled previous closed tickets of the customer.

8. A computerized system for playing a personalized voice recording with a status update to follow-up customer on an inbound call in a contact center comprising:
one or more processors;
an inbound software; and
an inbound database,
said one or more processors are configured to:
mark one or more open tickets as predicted for follow-up inbound call and predicted date and time for the follow-up call in the inbound database;
update status of one or more open ticket marked as predicted for follow-up inbound call and predicted date and time,
wherein said updating of the status of the one or more open tickets is operated by:

(i) operating an inbound software to route customer records marked as predicted for follow-up inbound call and predicted date and time thereof to one or more agents,
wherein the customer records are routed to an agent that is one of: a. agent who has handled the customer open ticket, and b. agent of one or more agents related to the open ticket, and (ii) receiving a status of the open ticket from an agent of the one or more agents via a computerized device of the agent and storing the status as a status update in the routed customer record of the customer records in the inbound database via a Customer Relationship Management (CRM) application that is communicating with the computerized device of the agent,
convert the updated status to a voice recording, and storing the voice recording in the inbound database,
wherein the converting of the updated status to the voice recording is operated by a Text To Speech (TTS) Application Programming Interface (API) engine having custom voice Artificial intelligence (AI) capabilities, and the voice recording includes voice of the agent, and
operate the inbound software to identify an inbound call as a follow-up inbound call of a customer received via a Voice over Internet Protocol (VOIP) network communicating with a customer's mobile device wherein the customer has an open ticket with an updated status and play voice recording with the status update in the identified inbound call, thus reducing customers waiting time and agents' workload,
wherein the customer has an open ticket with the updated status and playing the voice recording with the status update thus reducing customers waiting time and agents' workload.

9. The computerized system of claim 8, wherein said one or more processors are configured to mark the one or more open tickets as predicted for follow-up by:
operating the inbound software to retrieve one or more open tickets of customers from an inbound database;
for each open ticket in the one or more open tickets:
retrieving recording related to last interaction of the open ticket;
operating a predictive model on the retrieved recording to predict a follow-up inbound call and predicted date and time thereof for the open ticket; and
sending the predicted follow-up inbound call and predicted date and time thereof to the inbound software to store the follow-up inbound call and predicted date and time thereof in the inbound database.

10. The computerized system of claim 9, wherein the predictive model predicts the follow-up inbound call and predicted date and time thereof by:
operating a speech analyzer module to perform sentiment analysis via semantic parsing and voice sentiment analysis of the retrieved recording; and
operating a follow-up predictor module to predict a follow-up call to the contact center and related date and time.

11. The computerized system of claim 8, wherein the one or more processors are configured to update the status of the one or more open tickets by:
operating an inbound software to route customer records marked as predicted for follow-up inbound call and predicted date and time thereof to one or more agents;

receiving a status of the open ticket from an agent of the one or more agents via a computerized device of the agent and storing the status as a status update in the routed customer record of the customer records in the inbound database via a Customer Relationship Management (CRM) application that is communicating with the computerized device of the agent.

12. The computerized system of claim 11, wherein the status of the open ticket received from the agent has been provided by one or more users or retrieved from one or more applications.

13. The computerized system of claim 11, wherein the customer records are routed based on the predicted date and time of follow-up inbound call.

14. The computerized system of claim 11, wherein the customer records are routed to one or more agents during non-peak times in the contact center based on availability of the one or more agents.

15. The computerized system of claim 11,
wherein the agent is one of: a. agent that handled the customer open ticket so far; b. last agent that handled the customer open ticket, c. agent which has highest satisfaction score from all agents related to the open ticket, d. agent which has highest satisfaction score from all agents that handled previous closed tickets of the customer.

* * * * *